US007689062B2

(12) United States Patent
Baharav et al.

(10) Patent No.: US 7,689,062 B2
(45) Date of Patent: Mar. 30, 2010

(54) SYSTEM AND METHOD FOR VIRTUAL CONTENT PLACEMENT

(75) Inventors: Roy Baharav, Tel Aviv (IL); Guy Salton Morgenstern, Kiryat Ono (IL); Miky Tamir, Tel Aviv (IL)

(73) Assignee: SEAMBI Ltd., Raanana (IL)

( * ) Notice: Subject to any disclaimer, the term of this patent is extended or adjusted under 35 U.S.C. 154(b) by 85 days.

(21) Appl. No.: 11/812,412

(22) Filed: Jun. 19, 2007

(65) Prior Publication Data

US 2008/0012988 A1    Jan. 17, 2008

Related U.S. Application Data

(60) Provisional application No. 60/917,665, filed on May 13, 2007, provisional application No. 60/807,488, filed on Jul. 16, 2006.

(51) Int. Cl.
*G06K 9/20* (2006.01)
(52) U.S. Cl. ........................ 382/282; 348/589; 345/629
(58) Field of Classification Search .................. 382/282
See application file for complete search history.

(56) References Cited

U.S. PATENT DOCUMENTS

| | | | | |
|---|---|---|---|---|
| 4,954,912 | A * | 9/1990 | MacDonald et al. | ........ 358/448 |
| 5,436,672 | A | 7/1995 | Medioni et al. | |
| 5,543,856 | A | 8/1996 | Rosser et al. | |
| 5,627,915 | A | 5/1997 | Rosser et al. | |
| 5,729,279 | A * | 3/1998 | Fuller | .......................... 725/74 |
| 5,731,846 | A | 3/1998 | Kreitman et al. | |
| 5,745,379 | A * | 4/1998 | Lewis | .......................... 709/247 |
| 5,808,695 | A | 9/1998 | Rosser et al. | |
| 5,892,554 | A | 4/1999 | DiCicco et al. | |
| 5,903,317 | A * | 5/1999 | Sharir et al. | ................. 348/589 |
| 5,923,365 | A * | 7/1999 | Tamir et al. | ................. 348/169 |
| 5,953,076 | A * | 9/1999 | Astle et al. | ................... 348/584 |
| 6,100,925 | A | 8/2000 | Rosser et al. | |
| 6,181,345 | B1 | 1/2001 | Richard | |

(Continued)

FOREIGN PATENT DOCUMENTS

WO    WO 2008/053376    5/2008

OTHER PUBLICATIONS

Lubell, Sam, "Advertising's Twilight Zone: That Signpost Up Ahead May Be a Virtual Product", New York Times, Jan. 2, 2006.

*Primary Examiner*—Sath V Perungavoor
(74) *Attorney, Agent, or Firm*—Pearl Cohen Zedek Latzer, LLP

(57) ABSTRACT

An apparatus and method for embedding artwork into a video in several phases. Initially, a segment suitable for artwork placement is identified and marked within an original video, and a container is implanted therein to determine the appropriate position and video transformations for future artwork objects. Then, an artwork provider experiments with sending artwork for each container and viewing that artwork placed within the video, until the current artwork is approved for placement. Finally, a final version, which includes the selected artwork embedded within the original video, is rendered, adapted for a distributor, and the end product is distributed and viewed conventionally. The container implantation is relatively labor intensive and therefore expensive, but costs are subsequently distributed over many sessions of different artwork placements within the same container. Typical applications are in advertising, art and fun.

21 Claims, 13 Drawing Sheets

U.S. PATENT DOCUMENTS

| | | |
|---|---|---|
| 6,184,937 B1 | 2/2001 | Williams et al. |
| 6,208,386 B1 | 3/2001 | Wilf et al. |
| 6,229,550 B1 * | 5/2001 | Gloudemans et al. ....... 345/641 |
| 6,292,227 B1 * | 9/2001 | Wilf et al. .................. 348/587 |
| 6,297,853 B1 * | 10/2001 | Sharir et al. ................ 348/589 |
| 6,384,871 B1 | 5/2002 | Wilf et al. |
| 6,446,261 B1 | 9/2002 | Rosser |
| 6,525,780 B1 | 2/2003 | Bruno et al. |
| 6,529,613 B1 | 3/2003 | Astle |
| 6,559,884 B1 | 5/2003 | Tamir et al. |
| 6,741,725 B2 | 5/2004 | Astle |
| 6,750,919 B1 | 6/2004 | Rosser |
| 6,909,438 B1 * | 6/2005 | White et al. ................ 345/629 |
| 7,015,978 B2 | 3/2006 | Jeffers et al. |
| 7,139,034 B2 | 11/2006 | Kennedy et al. |
| 2001/0039520 A1 * | 11/2001 | Nakade et al. ................ 705/27 |
| 2002/0092019 A1 * | 7/2002 | Marcus ........................ 725/37 |
| 2003/0028432 A1 * | 2/2003 | Troyansky et al. ............ 705/14 |
| 2003/0076448 A1 * | 4/2003 | Pan et al. .................... 348/589 |
| 2003/0188321 A1 * | 10/2003 | Shoff et al. ................. 725/135 |
| 2004/0100581 A1 | 5/2004 | Williams |

\* cited by examiner

SYSTEM AND METHOD FOR VIRTUAL CONTENT PLACEMENT

CROSS REFERENCE TO RELATED APPLICATION

This application claims the benefit of U.S. provisional patent application 60/807,488 filed on Jul. 16, 2006, and of U.S. provisional patent application 60/917,665 filed on May 13, 2007.

BACKGROUND OF THE INVENTION

1. Field of the Invention

The present invention relates to virtual content placement in videos, and in particular to offline virtual content placement.

2. Description of Related Art

Virtual content placement is a video technique, used primarily in advertising, for altering video images by adding images, messages, slogans or indicia in such a manner that they appear to be part of the original image as displayed. To appear realistic, virtual content placement must precisely take into account changes in the position, size and perspective of background articles due to changing position and zoom of the camera that takes or took the original video. If the original video is taken purposely for supporting virtual content placement, the originally photographed scene may include special visually-identifiable areas or marks for facilitating the content placement. In other instances, visually-identifiable areas or objects that happen to exist in the photographed scene are exploited for the content placement process. There are two basic scenarios for virtual content placement: real-time and offline. In real-time virtual content placement, typically during a live broadcast of a sports event, there is a preparatory phase that determines visually-identifiable areas and points, which will be used for enclosing the product placement areas and for recognizing the dynamically-changing magnification and perspective. Generally speaking, real-time virtual content placement benefits from, and may be dependent on, having a visually-identifiable static arena, such as a tennis court. In the offline case, the background may change from one scene to another; therefore, existing videos are analyzed, segment by segment, to determine segments that their duration, visual characteristics and story are adequate for product placement; then, automated tools based on image processing techniques and supported by manual assistance of an experience human operator, are employed for segment selection and content placement. Such manual procedures offer high quality in matching and adjusting the placed content to the original segment, but are relatively costly because of the associated human labor.

The cost of virtual content placement is usually covered by advertisers. In videos that are distributed to a very large number of viewers, whether as a real-time broadcast of a sports event, a broadcast movie or an on-demand video, advertisers can afford the costs of virtual content placement. However, when video content reaches a relatively small number of viewers, virtual content placement becomes economically unfeasible.

The public data networks (for example, Internet and mobile) have introduced an entirely new realm for the distribution of videos. Now, many amateur photographers shoot videos and share them via commercial and non-commercial channels; many professional video producers use the Internet for distributing and merchandising new and archived content; and more and more video content is viewed via cellular telephones. Often, such content represents an opportunity for advertisers. However, offline virtual content placement is typically too costly in such cases because the number of viewers may be too small or unpredictable.

Cost distribution among advertisers and over time is applied in some low-cost advertising techniques, such as banners, text ads, pre/post roles and in-stream, which easily enable displaying a changing advertising content that is independent of the video content. The associated cost distribution affords advertising even when addressing relatively small audiences, because of both the ease of changing the advertised messages and the overall low production costs; however, such advertising methods are generally disliked by viewers. Offline virtual content placement could offer a much more attractive solution for both advertisers and viewers, but, unfortunately, present content placement techniques adapt specific advertising content to specific video segments and do not support cost distribution among advertisers or in advertising that changes over time.

If cost distribution for content placement becomes possible, also non-advertising applications can afford offline virtual content placement; for example, amateur or professional video photographers could to use virtual content placement as a special effect for their videos, for adding artistic or fun impact.

There is therefore a need for, and it could be advantageous to have, systems and functionalities for offline virtual content placement that supports cost distribution among multiple advertisers and/or advertising content that changes over time.

BRIEF SUMMARY OF THE INVENTION

The present invention seeks to provide systems and functionalities for offline virtual content placement that supports multiple content placement sessions within the same original video.

According to a first aspect, certain embodiments of the present invention implant one or more containers into a video. "Container", in the context of the present disclosure, is a set of compute-executable video processing commands specific to a selected video segment, that is effective to instruct a video rendering processor, which can be implemented in software and/or in hardware, to receive the video segment and a compatible artwork piece, and automatically place that artwork piece within the video segment so that the artwork piece appears to be part of the video, as if the artwork piece was present within the original scene when the video was filmed. It will be noted that a "video" includes a plurality of frames that differ from each other as a result of changes such as moving objects, moving camera, changing lighting, and/or changes in camera zoom, and it is the container that instructs the video rendering processor to place the artwork so that the artwork goes through similar transformations as its static or moving background. In other words, the placed artwork is "animated", under the commands of the container, in accordance with the selected video segment in which the artwork is placed. The container is thus a general-purpose instrument for artwork placement, that can be created before a prospective artwork is received for placement. The advantage is that a container is reusable for multiple instances of artwork placements that are made automatically and hence economically. There are two-dimensional (2D) containers that are adapted to place two-dimensional artwork such as a billboard or a virtual TV screen, and three-dimensional (3D) containers that are adapted to place three-dimensional artwork objects such as a car or a soda can. "Artwork", or interchangeably "content", is a visual multimedia object desired to be placed within videos; it can be two- or three-dimensional, and can be static (e.g. a still image or a 3D model) or dynamic (e.g., a 2D video clip or a moving 3D object). Artwork placed within a video will also be termed "embedded artwork" or "embedded content". The notion of "placing artwork in a container" is illustrative of the technical operation of a rendering processor, under the set of commands termed "container", to embed the artwork within the respective video segment that includes the container so that it appears part of the original video as filmed.

According to an optional second aspect, initially a dummy is placed in each container. "Dummy" in the context of the present disclosure is an arbitrary piece of artwork that complies with the artwork specification corresponding to a target container and has a distinctive visual appearance. Dummy placement within a container yields a "demo version" of the respective video segment for visually identifying the position, size and orientation of the space available for artwork placement within that video segment even before actual artwork of interest for placement is received. A dummy may be, for example, a distinctive color spot, or an exemplary artwork piece bearing a distinctive logo or highlighted with a distinctive color, pattern or frame.

According to a third aspect, preferred embodiments of the present invention provide systems and methods that allow artwork providers to place their selected artwork pieces within a video without needing the tools and skill for content placement and/or without devoting the time and effort required for conventional offline content placement. This is done by presenting a modified version of the video, including embedded artwork pieces (that can be dummies), to the artwork provider and allowing the artwork provider to provide respective artwork pieces, which are automatically and instantly placed within the respecting containers replacing the previous embedded artwork This offers the artwork provider an interactive experience of virtual artwork placement without being involved with the associated complexities and labor, which have already been resolved at the stage the container implantation.

For conserving bandwidth and saving time during iterations of experimenting with artwork placement, the demo version and/or the modified video are optionally further compacted, in comparison with the original video, by excluding parts of original video, preferably those that do not include containers, and/or applying a lower resolution than the original video, and/or reducing the color space, and/or applying excessive video compression. In an extreme case, the compacted demo/modified version can be reduced to a number of still images, each still image showing a selected frame representative of a marked video segment, showing the artwork (that can be dummy in the case of a demo) embedded inside.

The modified video is presented to the artwork provider, who either approves it for publishing or sends some other artwork for replacing the current artwork. The replacement artwork provided by the artwork provider can be entirely different than the previous artwork, or it can be a modified version of the previous artwork, for example a cropped or rotated version or just a change in options that affect how the artwork is displayed. When the modified video version is approved by the artwork provider, a final version is completed by placing the current artworks pieces within the respective containers, within the original (i.e. non-compacted) video. The final version is optionally further customized for a selected distributor, and the resulting end product is sent to that selected distributor, for distribution to end users.

The same demo can preferably but not necessarily be sent to several artwork providers, who place their own artwork within the respective containers until reaching their respective final versions. Additionally or alternatively, a single artwork provider can employ the system and process described herein for creating multiple different editions, for example for advertising different products. This distributes the costs of the relatively-expensive acts of segment selection and marking and container implantation, over a plurality of artwork placement instances, which is an advantageous aspect of preferred embodiments of the present invention. Instead of sending exactly the same demo to several artwork providers, demo versions can be customized for specific artwork providers, for example by selecting dummies that bear the logo of the prospective artwork provider or selecting dummies that use artwork provided by the prospective artwork providers. In some cases, a demo customized for an artwork provider by utilizing artwork sent by that artwork provider, can be good enough to require no further changes thus providing a basis for the final version. In other cases, it will take multiple iterations of artwork placement until the artwork provider is satisfied and approves the currently embedded artwork for the final version.

A service center that employs the above method preferably includes several functional units: a container implanter units that is used to obtain the original video, select and mark segments for embedding content, and implant containers within selected segments; and a renderer unit that is used to produce modified versions by placing artwork within the containers. The renderer unit also operates to produce the final version, wherein the most recent artwork is embedded within the original video. A producer unit finally adapts the content for selected distributors and sends the end products to the distributors.

Thus, according to preferred embodiments of the present invention, there is provided a method, service center and software product, for embedding artwork in videos, the method starting with preparing an original video for placement by obtaining the original video, marking a segment of the original video and implanting a container within the marked segment. This provides a reusable container that can be utilized many times for placing content within the marked segment. Each such content placement is implemented by selecting an artwork piece that matches the container according to the container specs, and then automatically placing the selected artwork piece within the container, which effectively renders a modified video segment that visually shows the artwork piece animated in accordance with the marked segment. Such repetitive sessions of artwork placement within the container can be used for two purposes: (1) for allowing an artwork provider to interactively select and adapt that artwork for the marked segment; and (2) for allowing different artwork providers (or the same artwork provider at another time), to generate different editions based on the same original video; for example, for advertising different products.

Optionally, in a first iteration, that is controlled by the service center without interactive participation of an artwork provider, the embedded artwork can be a dummy, in which case the modified segment forms part of a demo to give a prospective artwork provider a general impression of the size and shape of the desired artwork shown within the original video scenes. Later versions show embedded artwork pieces provided by the artwork providers, presented for the artwork provider's decision whether to approve the current artwork or replace it with another.

Often, more than one segment within an original video is marked for accommodating containers. Also, it is possible to implant more than one container within a selected segment. Therefore, in many practical cases, a modified video includes a plurality of artwork pieces placed within a plurality of containers within a plurality of video segments Demo versions and/or modified versions can be further compacted, in comparison with the original video, by using techniques such as excluding at least one part of the original video, representing a video segment by a representative still image, applying a lower resolution than the original video, reducing the color space, or applying excessive video compression.

When an artwork provider approves a modified video, a final version is generated wherein all current artwork pieces are embedded within the respective containers. The final version is preferably a conventional video, viewable by standard video players. The final version is sometimes further transformed to an end product adapted for a specific distributor, for example by reducing the size and color space and changing the aspect ration of the video if it is to be viewed on mobile phone screens.

BRIEF DESCRIPTION OF SEVERAL VIEWS OF THE DRAWINGS

The present invention will be understood and appreciated more fully from the following detailed description, taken in conjunction with the drawings in which.

DETAILED DESCRIPTION OF PREFERRED EMBODIMENTS

The System

Figure 1:
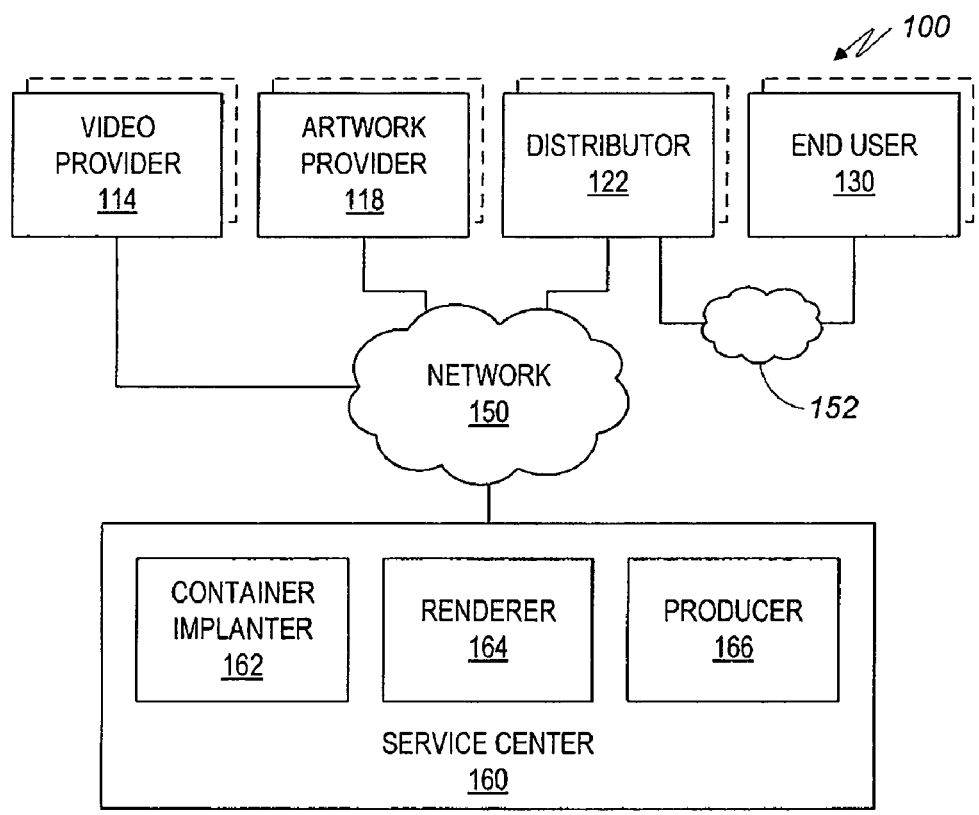
FIG. 1 is a simplified block diagram describing a system according to a preferred embodiment of the present invention.

Reference is made to FIG. 1, which describes a system 100 in accordance with a preferred embodiment of the present invention.

Service center 160 is a computer or a computer system that provides to one or more artwork provider 118, services of artwork placement into videos provided by one or more video provider 114. The final video, including the embedded artwork, is then sent to one or more distributor 122, which distributes the final video to a plurality of end user 130. Network 150, such as the Internet, connects service center 160 with video provider 114, artwork provider 118 and distributor 122; while network 152, that can be the same or different than network 150 (e.g. it can be a cellular network for distributing videos to mobile phones) is used for sending content from a distributor 122 to an end user 130.

Video provider 114 is a computer of a commercial or non-commercial entity that has produced or otherwise owns a video and is willing to provide its video for virtual artwork placement. Artwork provider 118 is a computer of a commercial or non-commercial entity that has produced or otherwise owns artwork and is willing to place that artwork into videos. Distributor 122 is a computer of a commercial or non-commercial entity that runs video distribution operation to end users 130. End user 130 is a terminal of an individual that can receive a video from a distributor 122 via network 152 and show that video.

Service center 160 includes three main logical units: container implanter 162, renderer 164 and producer 166. These logical units can be implemented as any combination of hardware units and software modules of one or more computers that serve service center 160. Container implanter 162 is operative for selecting and marking video segments that are suited for artwork placement and implant a container (or containers) within each such segment. Renderer 164 is operative to combine a video, its containers and artwork pieces, into a modified video that included embedded artwork, and provide full or compacted versions of such modified video for previewing or viewing. A "modified video" is a conventionally-viewable video that includes embedded artwork that has been placed therein. A "compacted version" of a video comes to reduce bandwidth requirements, communication time and/or viewing time during the artwork placement process described below; it may skip video parts that have not been selected and marked for artwork placement, reduce the image resolution, use excessive video compression, apply a reduced the color space, etc. In an extreme case, the compacted version can be represented by a collection of still images, each still image showing a selected frame representative of a marked video segment. By "excessive video compression" is meant a level of compression that noticeably reduces the image quality yet is still sufficient for previewing purpose. Producer 166 adapts a final version produced by renderer 164 according to characteristics defined by distributor 122, and sends it to distributor 122; for example, if the original video is of high resolution and distributor 122 distributes video content to mobile telephones 130, producer 166 may reduce the resolution of the end product according to the characteristics of the mobile phone screens; alternatively, as agreed between service center 160 and distributor 122, producer 166 may provide a full-resolution end-product to distributor 122, and adaptation to the required characteristics, for example those of mobile phone screens, is then made by distributor 122

Data Flow

Figure 2:
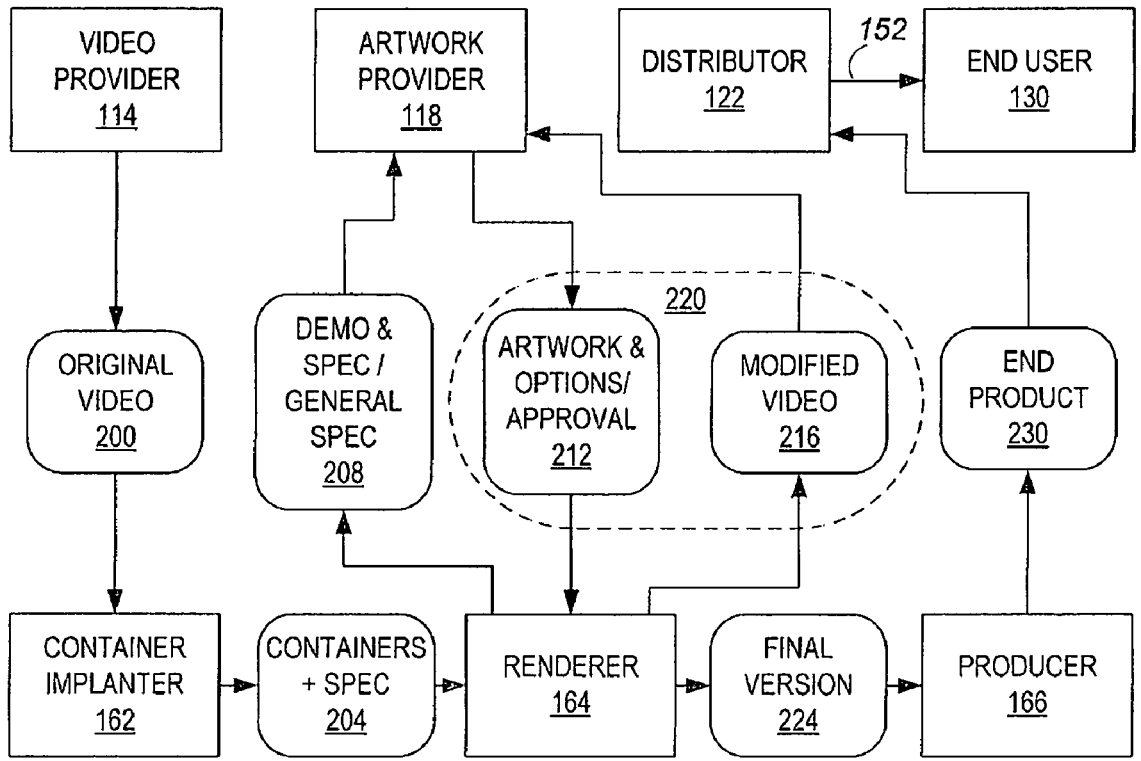
FIG. 2 is a simplified flow diagram describing the data flow within the system of FIG. 1.

Reference is now made to FIG. 2, which describes the data that flows within the preferred embodiment of FIG. 1. In this figure, rectangles represent units or modules of FIG. 1, while rounded-corner boxes represent data entities moved between the units or modules.

Thus, original video 200 is the original video provided by video provider 114 to container implanter 162 of service center 160, for artwork placement. Container implanter 162 is then assisted by a human operator to identify and mark video segments that are suitable for artwork placement, implant one or more containers in each such segment, and produce a spec for the artwork that is appropriate for each container. Then, the resulting containers and spec 204 are sent to renderer 164.

Optionally, in some preferred embodiments, renderer 164 places, within each container, a respective visually-distinguishable dummy that complies with the container's spec, and produces a demo version, that shows the original video or parts thereof with dummies embedded. For efficiency and bandwidth considerations, the demo may be compacted by lowering the resolution and/or applying excessive video compression, reducing the color space and/or skipping some video parts that do not include containers, or be represented by a collection of still images, each still image showing a selected frame representative of a marked video segment. Renderer 164 then packages the spec from containers and spec 204 and the demo, into demo and spec 208 which is sent to artwork provider 118. It will be noted that demo and spec 208 provides artwork provider 118 with a visual demonstration (by the dummies) of the areas available for artwork placement, and with legible guidelines (the specs) regarding the artwork that is suitable for each container, i.e. to replace each dummy. Thus, artwork provider 118 need not be involved in the technicalities of the containers, but merely with visual dummy replacements under predefined specs. The human operator of artwork provider 118 is thus relieved from the need to have knowledge and experience in, as well as devote time to, conventional methods for virtual content placement; he or she is just expected to select artwork that complies with specs and aesthetically and contextually fits to replace visually-identifiable dummies within the demo. In alternative embodiments, however, a demo using dummies is not initially produced by renderer 164, and message 208 provides just general specs of the artwork that will fit into the implanted containers, and the artwork provider then initially blindly sends compatible artwork, and will get a first impression of the video using its own artwork (instead of dummies), in the first version of modified video 216.

Having received demo and spec 208, an operator of artwork provider 118 selects artwork pieces for each dummy-replacement (i.e. for each container). Alternatively, if message 208 included just general specs without a demo, the operator of artwork provider 118 selects artwork pieces that match the specs. In either case, the artwork pieces can be selected from an existing artwork pool of artwork provider 118, or be prepared or adapted specifically for the demo and spec/general spec 208. Artwork provider 118 then returns artwork and options 212 to renderer 164, which includes the selected artwork for each container, as well as selectable options of how the artwork is to be displayed within the containers, under guidelines defined by the artwork spec.

Renderer 164 places the received artwork pieces within the respective containers and according to the selected options, to generate a modified video 216. If message 208 contained a demo, the dummies of demo and spec 208 are effectively replaced by the artwork pieces presently provided by artwork provider 118 and according to the options selected by artwork provider 118. Also here, for efficiency and bandwidth considerations, the modified video 216 is optionally compacted using a lower resolution, higher compression, reduction of the color space, skipping some video parts that do not include containers, or even representing a video segment by a still image that shows a representative original video frame with the respective artwork embedded in it. If the operator of artwork provider 118 is satisfied with the current modified video 216, it can approve the current version (e.g. send an approval message 212); alternatively, it can modify artwork and options 212 by replacing the artwork and/or updating the options, and view another modified video 216, until the modified video 216 is satisfactory. It will be noted that preferably, renderer 164 promptly responds to the received artwork and options 212 by sending modified video 216, which turns loop 220 into an interactive experience for artwork provider 118, i.e. the effect of changes in the provided artwork and/or option 212 is immediately inspected through viewing modified video 216.

Once renderer 164 has received an approval message 212 from artwork provider 118, it combines the original video with the latest embedded artwork approved by artwork provider 118, into a final version 224 that is sent to producer 166. Producer 166 then optionally adapts final version 224 to characteristics specified by distributor 122 (for example, resolution, screen aspect ratio, feature length), which yields end product 230 that is sent by service center 160 to distributor 122, which conventionally distributes the end product video, with the embedded artwork, to end users 130.

It will be appreciated that container implanter 162, renderer 164 and producer 166 of service center 160 are functional units that can be implemented within one or mole physical computers, using general-purpose and/or dedicated hardware. Thus, in one extreme exemplary embodiment, service center 160 is implemented via specialized software modules within a single general-purpose computer, while in another extreme exemplary embodiment, container implanter 162, renderer 164 and producer 166 are implemented within three distinct computers or computer systems that are interconnected via the Internet and utilize also dedicated hardware components for image processing.

System Operation

Figure 3:
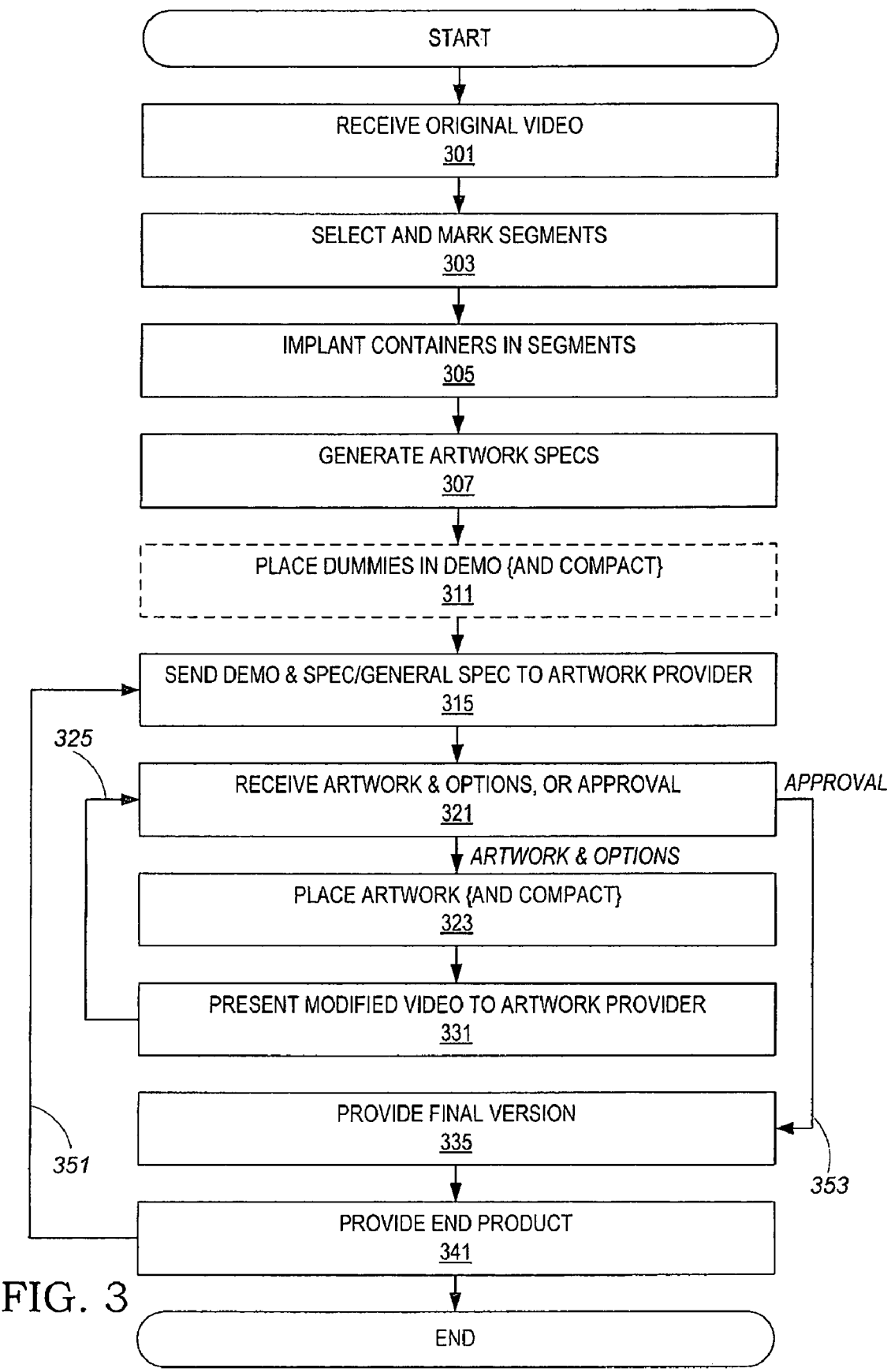
FIG. 3 is a simplified flowchart describing the operation of the system of FIG. 1.

Reference is now made to FIG. 3, which schematically describes the operation of service center 160 of the preferred embodiment of FIGS. 1-2. In step 301, original video 200 is obtained by service center 160 from a video provider 114 In step 303, container implanter 162 operates, under instructions from a human operator, to identify video segments that are suitable for artwork placement, and mark each such segment. In step 305, container implanter 162 implants one or more containers in each marked segment. In step 307 container implanter 162 generates a spec for the artwork that is suitable for each container; prefer ably, such spec identifies also selectable options for artwork placement (see FIGS. 4-5). The results of steps 305-307 are transferred as containers and spec 204 to renderer 164, which in optional step 311 produces a demo by placing respective dummies in all containers and possibly compacting the demo version by eliminating unmarked video parts, or representing a marked video segment by a representative still image, and/or reducing resolution, and/or reducing the color space, and/or applying excessive video compression. In step 315 service center 160 communicates with an artwork provider 118, and demo and spec 208 (or just general specs generated in step 307) are sent to artwork provider 118. In step 321, renderer 164 initially receives artwork and options 212 from artwork provider 118; in a second or later iteration, it may receive from artwork provider 118 an approval for the current version. In step 323, renderer 164 automatically places the recently-received artwork according to the respective options within the respective containers, and in step 331 it sends the resulting video (possibly compacted as described with respect to step 311 above)

as a modified video 216 to artwork provider 118, and loops back through passage 325 to step 321. In the case that in step 321 renderer 164 receives an approval from artwork provider 118, then the process moves through passage 353 to step 335, where a final version for the current artwork provider, that includes the original video 200 with the embedded artwork approved by artwork provider 118 in step 321, is provided by renderer 164 to producer 166. In step 341 producer 166 optionally adapts end product 230 for distributor 122 by modifying the resolution, format and/or feature length of final version 224 to specific requirements of distributor 122, and sends it to distributor 122, and then service center 160 is ready to move through passage 351 to step 315, so serve another artwork provider 118, or the same artwork provider 118 for creating another video edition, in placing a different artwork in same containers within original video 200.

It will be noted that while passage 351 is described in FIG. 3 as a serial process, wherein service center 160 operates to first finish placing artwork from a first artwork provider into original video 200 and then becoming ready for serving another artwork provider, service center 160 can also operate to concurrently serve a plurality of artwork providers in embedding their artwork into the same containers of original video 200, yielding customized editions of end product 230 for each artwork providers. It will also be noted that when relating to "another artwork provider", actually the existing artwork provider can use the system again for generating another edition of the same video, e.g. by advertising another product or using alternative artwork.

Cost Distribution

FIG. 3 can be used to demonstrate the cost-distribution advantage of the present invention. It will noted that the most time-consuming and human labor-intensive parts of the operation of service center 160, are in steps 303, 305 and 307. Steps 311-341 are mostly automatic for service center 160, and are therefore of relatively low cost for service center 160. Thus, the more times passage 351 is used for serving additional artwork placement sessions, the lower the cost-per-session becomes. Accordingly, in modes of operations where passage 351 is operated a large number of times, also non-commercial users can afford artwork placement for artistic effects or fun.

Also, it will be appreciated that some manual labor is typically needed on the side of artwork provider 118 for providing artwork and options 212 within step 321. However, such labor is calculated and justified separately by artwork provider 118, which does not directly impact the cost structure of service center 160. Moreover, in comparison to the older placement methods, the acts of providing, adapting and experimenting with artwork placement are much more effective, efficient and inexpensive under the interactive process 220 (FIG. 2) than when negotiating, submitting and approving artwork in conventional content placement.

ILLUSTRATIVE EXAMPLE

Figure 16A:
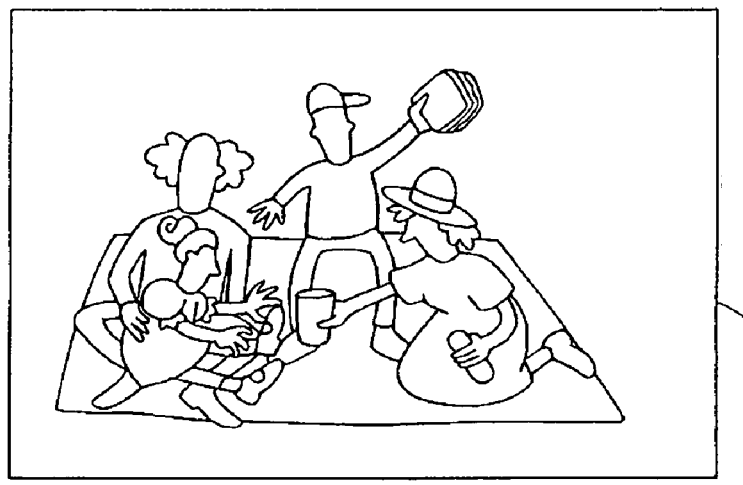
FIGS. 16A-C are illustrative demonstrations describing original, demo and modified versions of a video frame.
Figure 16B:
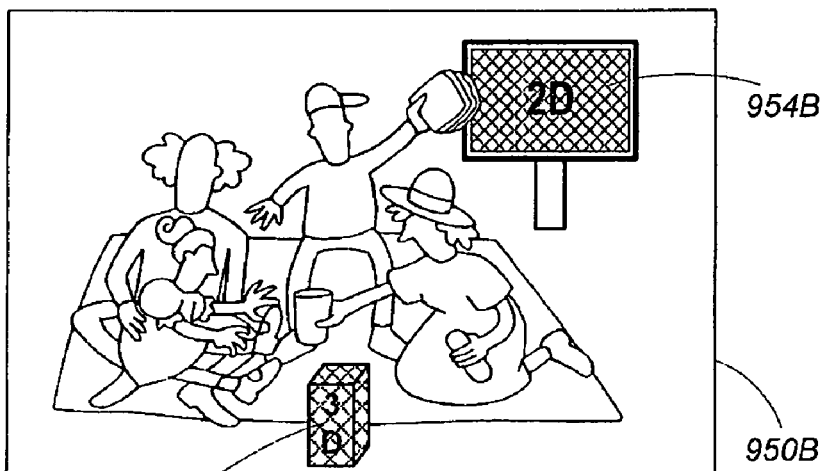
Figure 16C:
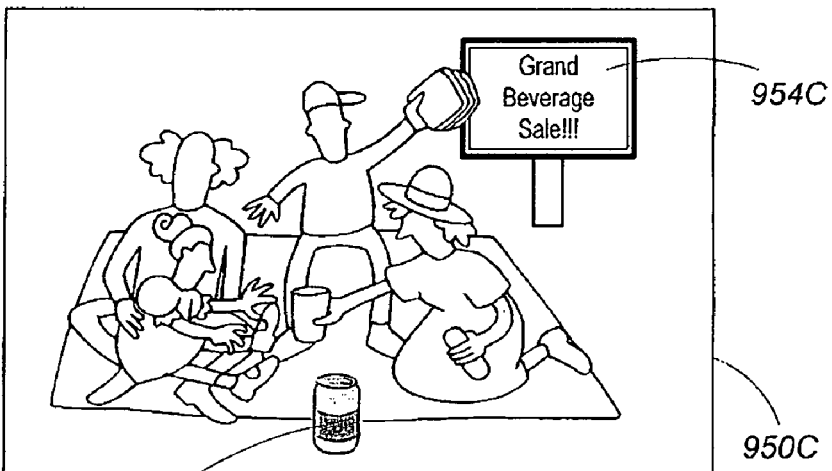

Reference is made to FIGS. 16A-C, where FIG. 16A demonstrates an original video frame 950A, FIG. 16B demonstrates an optional demo video frame 950B that shows dummies placed within the original frame, and FIG. 16C demonstrates a modified video frame 950C in which artwork has been placed.

Thus, original video frame 950A has been selected and marked in step 303 of FIG. 3. Optional demo video frame 950B is the result of step 311, and includes, in the current example, two dummies that are identifiable by distinctive colors and/or patterns: two-dimensional dummy 954B and three-dimensional dummy 958B. The dummies identify for an artwork provider the position, size, orientation and context of the respective containers that have been implanted within original video frame 950A in step 305, which containers are preferably but not necessarily invisible by themselves. Upon receiving, is step 321, actual artwork from the artwork provider, that artwork is placed, in step 323, within the respective containers, which yields modified video frame 950C that shows the actual two-dimensional artwork 954C and three-dimensional artwork 958C placed within original video frame 950A.

Containers

Figure 4:
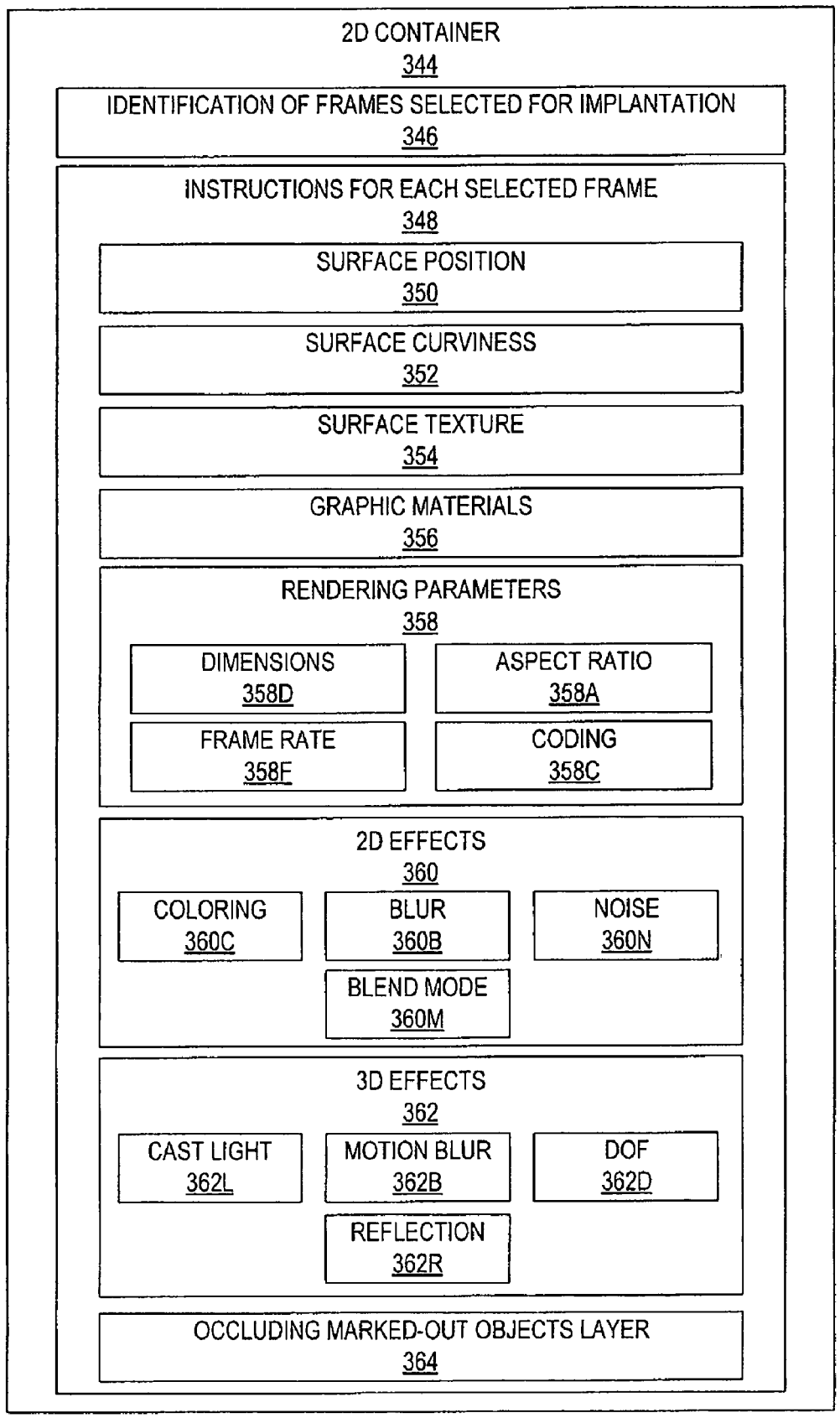
FIG. 4 is a simplified block diagram of a two-dimensional container.
Figure 5:
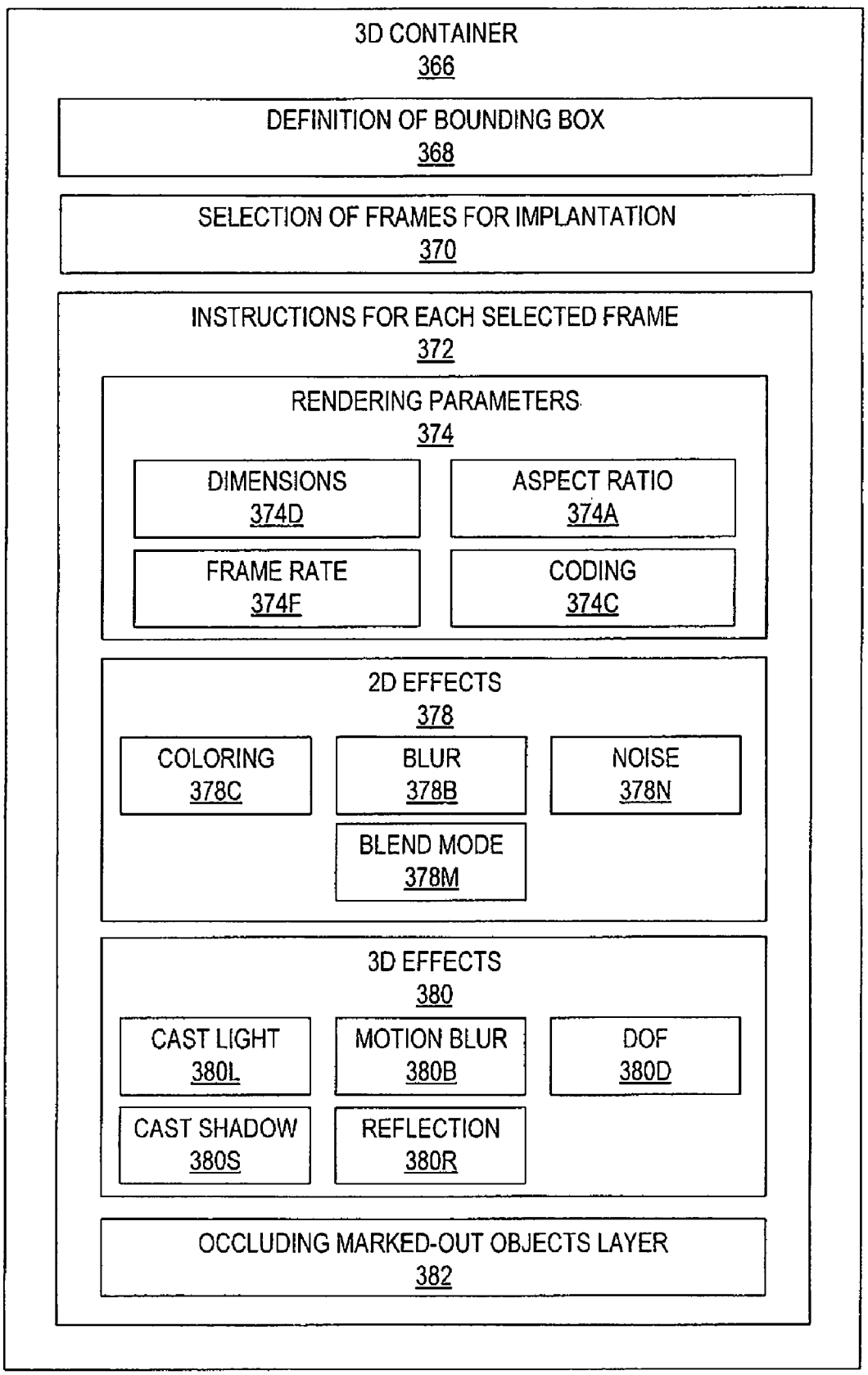
FIG. 5 is a simplified block diagram of a three-dimensional container.

FIGS. 4 and 5 describe 2D (two-dimensional) and 3D (three-dimension) containers, respectively. A container is actually as set of video processing commands specific to a selected video segment, that is effective to instruct renderer 164 to receive the video segment and an artwork piece that complies with the spec of the container, and automatically place that artwork piece within the video segment so that the artwork piece is automatically animated similarly to the background that accommodates the container (and hence that artwork piece) within the respective video segment This is devised in order to give any compatible artwork piece that is selected for placement an appearance as if that artwork piece was present within the scene of the selected video segment when the video was filmed.

Two-Dimensional Containers

Reference is now made to FIG. 4, which describes a two-dimensional container according to a preferred embodiment of the present invention. The two dimensional container is defined by several graphic features described below. Identification of frames selected for implantation 346 marks all the frames of original video 200 in which the 2D container is placed. Instructions for each selected frame 348 include the information that describes, for each frame, the graphic features of the container. This information is detailed with reference to blocks 350-364 below.

Figure 15:
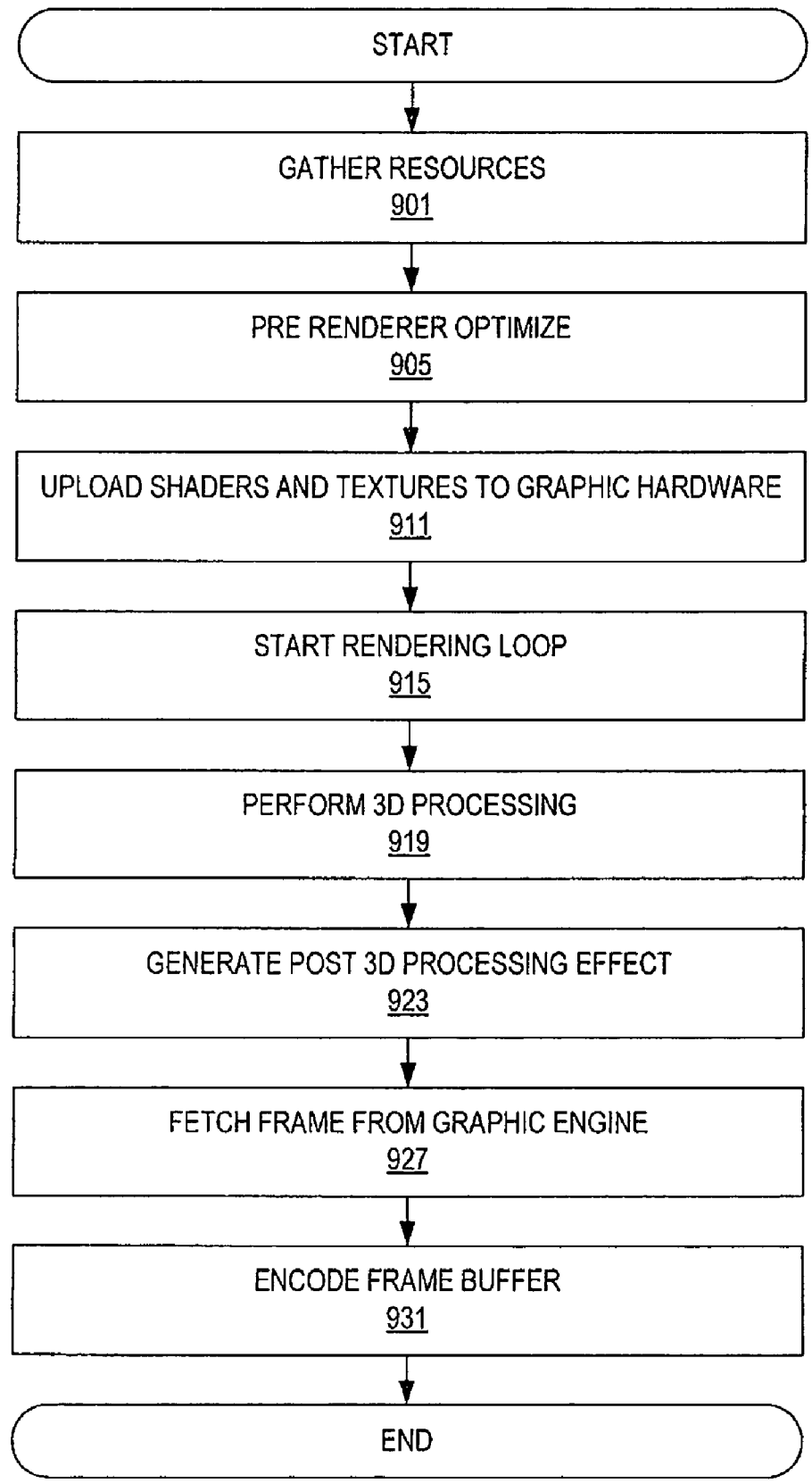
FIG. 15 is a simplified flowchart describing the rendering process

Surface position 350 describes the position of the 2D container's surface, preferably in terms of X,Y,Z coordinates that represent the actual three-dimensional position of the surface. Surface curviness 352 describes the actual shape of the surface that can be curved and include bumps, deeps, and peaks with no restriction; the curviness is described in terms of 3D model shape that is comprised of polygons with fixed position, rotation and scale. Surface texture 354 describes the texture that wraps the surface. For example, the texture may have wood like or metal like texture feature. Texture can be comprised of an image or be composed of layers having fixed colors in different blends. In addition, any texture's layer can have qualities additionally to its original color or image, such as ambient operator and specular operator. The texture, described below with reference to FIG. 15, is composed with artwork & options 212 to form the final cover for the surface. This means that the artwork replaces one of the layers (represented by the dummy) that together with other layers creates the texture that covers the desired surface.

Graphic materials 356 describes in details the texture or textures that cover the 2D container's surfaces. For example if the 2D container is a billboard sign, one of the surfaces can be covered by a metallic look like texture. In addition one or more of the 2D container's surfaces holds the dummy artwork. The artwork or the dummy includes texture that covers one or more of the 2D container's surfaces. Artwork material can be composed of multiple textures including the artwork or dummy artwork which means that the result can have complex material to cover the surface. For example, the material can be composed of metallic-like texture and jpeg artwork, which together creates the material that cover one or more of the artwork surfaces. Rendering parameters 358 describes what effects and features to use while transforming the three dimensional scene into a two dimensional image sequence. The rendering parameters 358 preferably include four different parameters: aspect ratio 358A describes the pixel aspect ratio; dimensions 358D describes the image width and height; frame rate 358F describes the frame rate of the created images if they are packed into one video; and coding 358C describe the coding and format of the output images or video file. All the four parameters are being set out of common video standards such as PAL or NTSC. Alternatively, the parameters can also support new types of video formats with non conventional frame rate, dimensions, aspect ratio and coding.

Still in FIG. 4, 2D effects 360 preferably includes a set of two dimensional filters that manipulate the image pixels to create a desired visual effect, to obtain better visual contrast and emphasis: coloring 360C transforms the color of inserted artwork from artwork & options 212 to a desired color for the placed artwork; and blur 360B that blurs the placed artwork. Additionally, noise 360N adds random noise to the placed artwork from artwork & options 212 to match the pixel noise to the pixel noise of the original video 200, while blend mode 360M determines how each pixel of the placed artwork is to be blended with the corresponding background pixel of the original video, preferably out of four commonly-used blending modes in digital imaging: normal, multiply, overlay and screen. 3D effects 362 includes filters that take into account the 3D scene parameters to create desirable graphic effects. Cast light 362L defines artificial (i.e. computer-generated) light sources that cast selectable type of light models such as OMNI light, directional light or spot light, on the 2D container. Such lights change the pixels' color of the 2D container according to the light model. Motion blur 362B defines the blur that is added to the 2D container as function of the container motion. DOF 362D describes the artwork blur according to its position in the scene and the distance from the camera. Moreover the effect imposes different blur parameter to each pixel according to its relative position. Reflection 362R defines reflection of the 2D container and the placed artwork from artwork & options 212 over relative plane. It will be noted that 2D effects 360 and 3D effects 362 allow container implanter 162 to controllably highlight, emphasize and distinguish the placed artwork over the original video while preserving the visual impression that the placed artwork was present when the original video was taken. Tuning such effects may require inputs from a human operator of container implanter 162 during experimentation, which is one of the cost factors that the present invention comes to distribute among different artwork providers. Still in FIG. 4, occluding marked-out objects 364 is a sequence of images that include the RGBA channels of all the objects' pixels that cover the placed artwork. In this way the final version 224 is composed of the background video covered by the placed artwork which is covered by the occluding marked-out objects layer.

Three-Dimensional Containers

Reference is now made to FIG. 5, which describes the elements of three dimensional containers, i.e. the graphic parameters needed to place three-dimensional artwork from artwork & options 212 into the original video 200. 3D container 366 includes definition of bounding box 368 that depicts the dimensions, orientation and position of a box-like shape that defines a boundary for placing 3D artwork from artwork & options 212. The boundary defines the maximum size of the placed artwork and restricts how such artwork can be positioned to avoid extending out of the boundary. Still in FIG. 5, selection of frames for implantation 370 marks all the frames of original video 200 in which the 3D container is placed. Instructions for each selected frame 372 include the information that describes, for each frame, the graphic features of the container. This information is detailed with reference to blocks 374-382 below.

Rendering parameters 374 describes what effects and features to use while transforming the three dimensional scene into a two dimensional image sequence. The rendering parameters 374 preferably include four different parameters: aspect ratio 374A describes the pixel aspect ratio; dimensions 374D describes the image width and height; frame rate 374F describes the frame rate of the created images if they are packed into one video; and coding 374C describe the coding and format of the output images or video file. All the four parameters are being set out of common video standards such as PAL or NTSC. Alternatively, the parameters can also support new types of video formats with non conventional frame rate, dimensions, aspect ratio and coding. 2D effects 378 preferably includes a set of two dimensional filters that manipulate the image pixels to create a desired visual effect, to obtain better visual contrast and emphasis: coloring 378C transforms the color of inserted artwork from artwork & options 212 to a desired color for the placed artwork; and blur 378B that blurs the placed artwork. Additionally, noise 378N adds random noise to the placed artwork from artwork & options 212 to match the pixel noise to the pixel noise of the original video 200, while blend mode 378M determines how each pixel of the placed artwork is to be blended with the corresponding background pixel of the original video, preferably out of four commonly-used blending modes in digital imaging: normal, multiply, overlay and screen. 3D effects 380 includes filters that take into account the 3D scene parameters to create desirable graphic effects. Cast light 380L defines artificial (i.e. computer-generated) light sources that cast selectable type of light models such as OMNI light, directional light or spot light, on the 3D container. Such lights changes the pixels' color of the 3D container according to the light model. Motion blur 380B defines the blur that is added to the 3D container as function of the container motion. DOF 380D describes the artwork blur according to its position in the scene and the distance from the camera. Moreover the effect imposes different blur parameter to each pixel according to its relative position. Reflection 380R defines reflection of the 3D container and the placed artwork from artwork & options 212 over relative plane. Cast shadow 380S defines the shadow surfaces and the way they absorb shadow in the presence of light source and object. Occluding marked-out objects 382 is a sequence of images that include the RGBA channels of all the objects' pixels that cover the placed artwork. In this way the final version 224 is composed of the background video covered by the placed artwork which is covered by the occluding marked-out objects layer. It will be noted that 2D effects 378 and 3D effects 380 allow container implanter 162 to controllably highlight, emphasize and distinguish the placed artwork over the original video while preserving the visual impression that the placed artwork was present when the original video was taken. Tuning such effects may require inputs from a human operator of container implanter 162 during experimentation, which is one of the cost factors that the present invention comes to distribute among different artwork providers.

Segment Selection, Container Generation and Spec Generation

Figure 6:
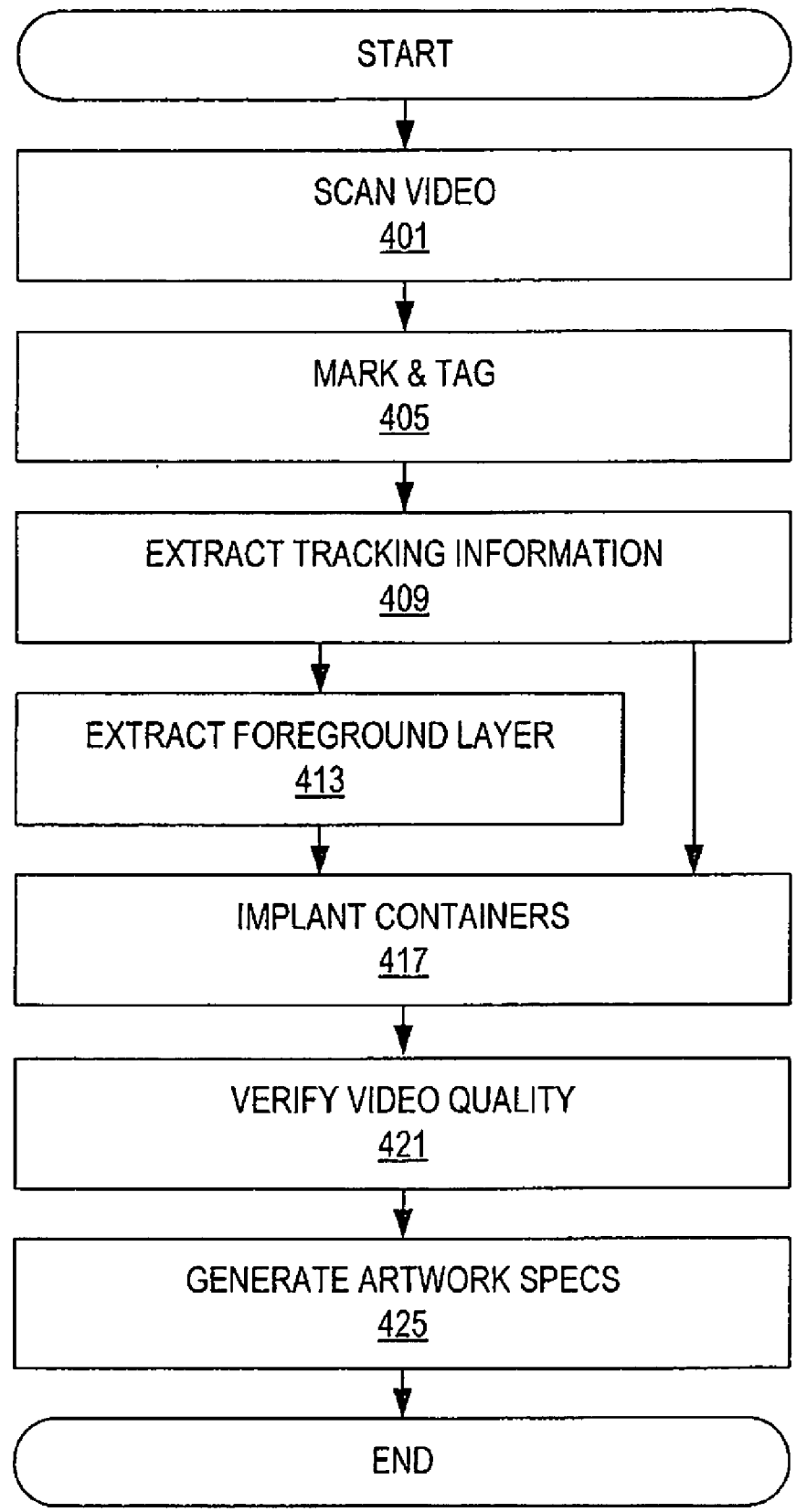
FIG. 6 is a simplified flowchart describing segment selection, container implantation and artwork spec generation.

Reference is now made to FIG. 6 that describes the creation, by container implanter 162, of two and/or three dimensional containers and the generation of a spec for each container for guiding artwork providers 118. In step 401, an operator of container implanter 162 runs a quick scan of the original video 200 to identify potential segments (frame ranges) that are suitable, by their content and context, for content placement.

In step 405, following the quick scan, selected segments are marked (e.g. by recording frame ranges), and for each segment the type (2D or 3D) and surface position 350 of the preferred content, as well its basic parameters are roughly drafted; such parameters, that will be further fine tuned in step 417, preferably include surface curviness 352, surface texture 354, and graphic materials 356. Moreover, in step 405 the operator tags each container in the spec. The purpose of this tagging is to describe what would be the proper context of the artwork for that container. For example, a container might be tagged with "child oriented", "outdoor", "comedy".

In step 409 the operator of container implanter 162 extracts tracking information for each container. The tracking is being extracted in order to assign the container its proper position, rotation and scale in every frame. For example, if content is desired to be placed on a wall that forms part of a scene and the camera is moving in that scene, there is a need to change the position and perspective of the artwork in every frame to match the changing perspective of the wall. There are two types of tracking information that are preferably extracted for each container. The first type is camera tracking information. This data is being extracted when the object remains stationary while the camera moves along the scene. The camera has seven different parameters that change from frame to frame—three position parameters, three rotation parameters, and a zoom parameter. The second type of tracking data relates to object tracking: the process tracks the movement of an object and completely ignores the camera. For example, if there is a moving bus in the scene and content is to be implanted on its side, the bus' surface is tracked so that when the content is placed on the bus' surface, its perspective and position would match the perspective and position of bus.

In step 413 objects that should occlude the future placed content are detected. This relates to the cases where some moving objects within the scene will pass between the placed content and the camera thereby cover some portion of that content. In order to achieve that effect, any element that will cover the future inserted artwork needs to be identified and marked out. In the process of marking out such objects, two video layers are created. One layer is the original video and the second layer is the marked out objects. The marked out objects' video layer includes in addition to its RGB channels an alpha channel. In case that tracking information is available, it is possible to use that information to better and quicker mark out the occluding objects. In step 417, 2D and/or 3D containers are embedded, as described below with reference to FIGS. 7-8.

In step 421, the container quality is verified by an operator of container implanter 162, who implants various samples of test content within each container and views the resulting video for verifying realistic appearance. When flaws are identified in step 421, step 417 is repeated for the appropriate containers until the results are satisfactory. In step 425, spec for artwork providers is generated to provide guidelines for the appropriate content for each container, as described in more detail with reference to FIGS. 7, 9 and 10 below.

Three-Dimensional Container Generation

Figure 7:
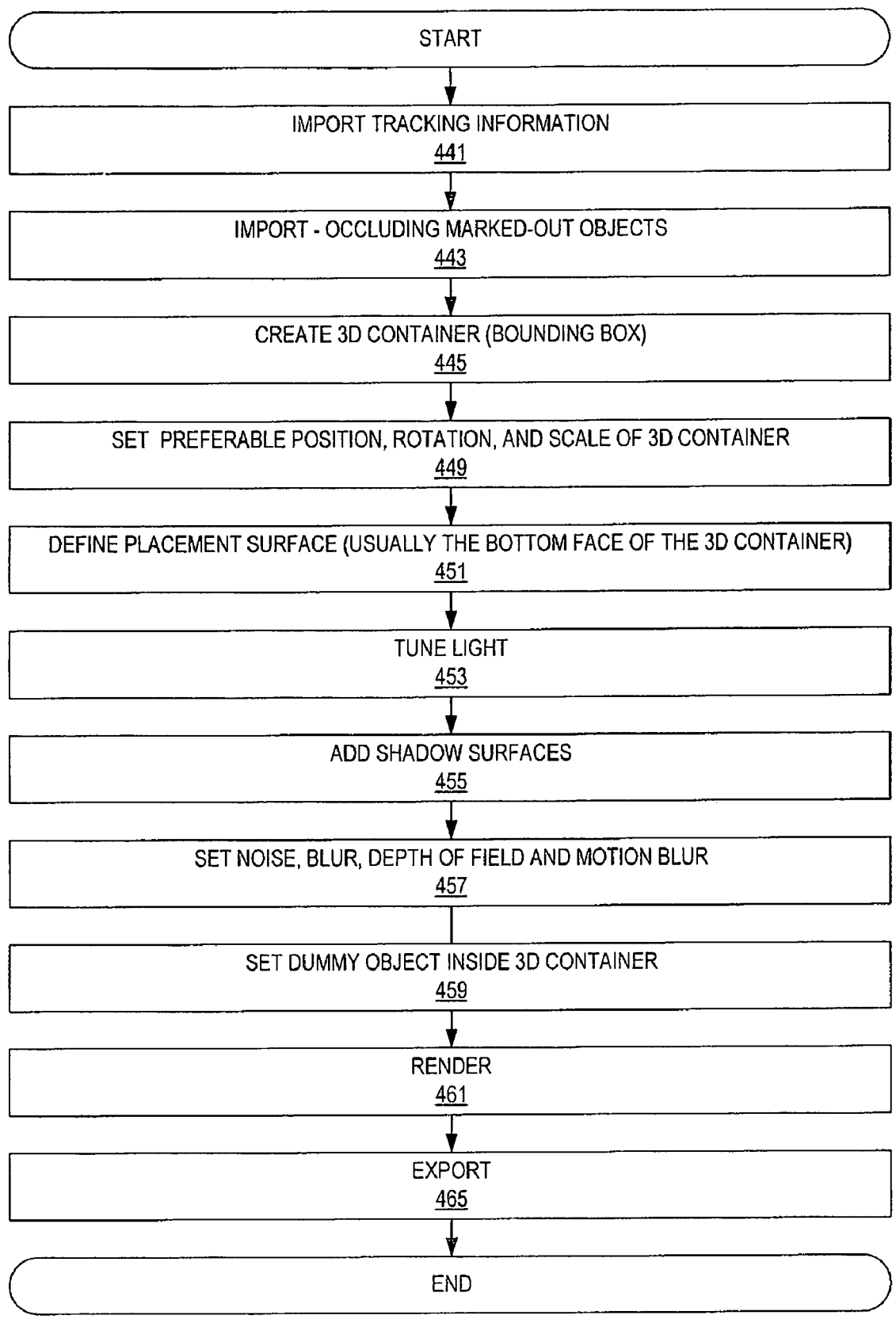
FIG. 7 is a simplified flowchart describing three-dimensional container implantation.

Reference is made to FIG. 7 that describes a process for implanting a three-dimensional container. Step 441 includes importing the tracking information to be attached to the three dimensional container for proper animation. Step 443 includes importing the occluding marked-out objects layer. Both elements have been described with reference to FIG. 6 above.

In step 445, the operator of container implanter 162 defines a three dimensional bounding box for three-dimensional content. This bounding box defines the maximum dimensions of content that can be placed within that container. In step 449 the operator defines the initial position, rotation and scale of the bounding box; those parameters may change throughout the segment according to the tracking data which affects the image animation In step 451 the face of the container that holds the future content is defined; preferably, the bottom face is chosen. For example, if a container is placed on a table that forms part of the original scene, then choosing the bottom face allows placing 3D content on the table. In step 453 a virtual source of lighting is defined by color and intensity and is placed to emulate the light source of the original scene and we place this light in the proper place. In step 455 a shadow surface is created that can absorb the shadow cast from future placed artwork. For example, it is desirable that a bottle on a table cast a different shadow than the small can on that table, according to their different size and shape. Therefore, a dynamic surface is being created to absorb the dynamic shadow. The shadow is preferably being created automatically taking into account the lighting and corresponding surface parameters.

In step 457 the operator of container implanter 162 fine tunes additional effects such as blur, noise, motion blur and depth of field to apply on any inserted future artwork for obtaining a desirable aesthetic effect. In step 459, the operator inserts a dummy object into the container, for test purposes. In step 461 a rendering operation generates a movie clip that shows the dummy test object placed within the container within the scene of the current video segment, taking into account all the parameters counted above; if the rendered result is unsatisfactory to the operator, the appropriate parameters are adjusted. Upon reaching a satisfactory result, then in step 461, the completed container is exported to become part of containers and spec 204 of FIG. 2. A similar process of FIG. 7 is then run for all three-dimensional containers to be implanted within the selected and marked segments of original video 200.

Two Dimensional Container's Generation

Figure 8:
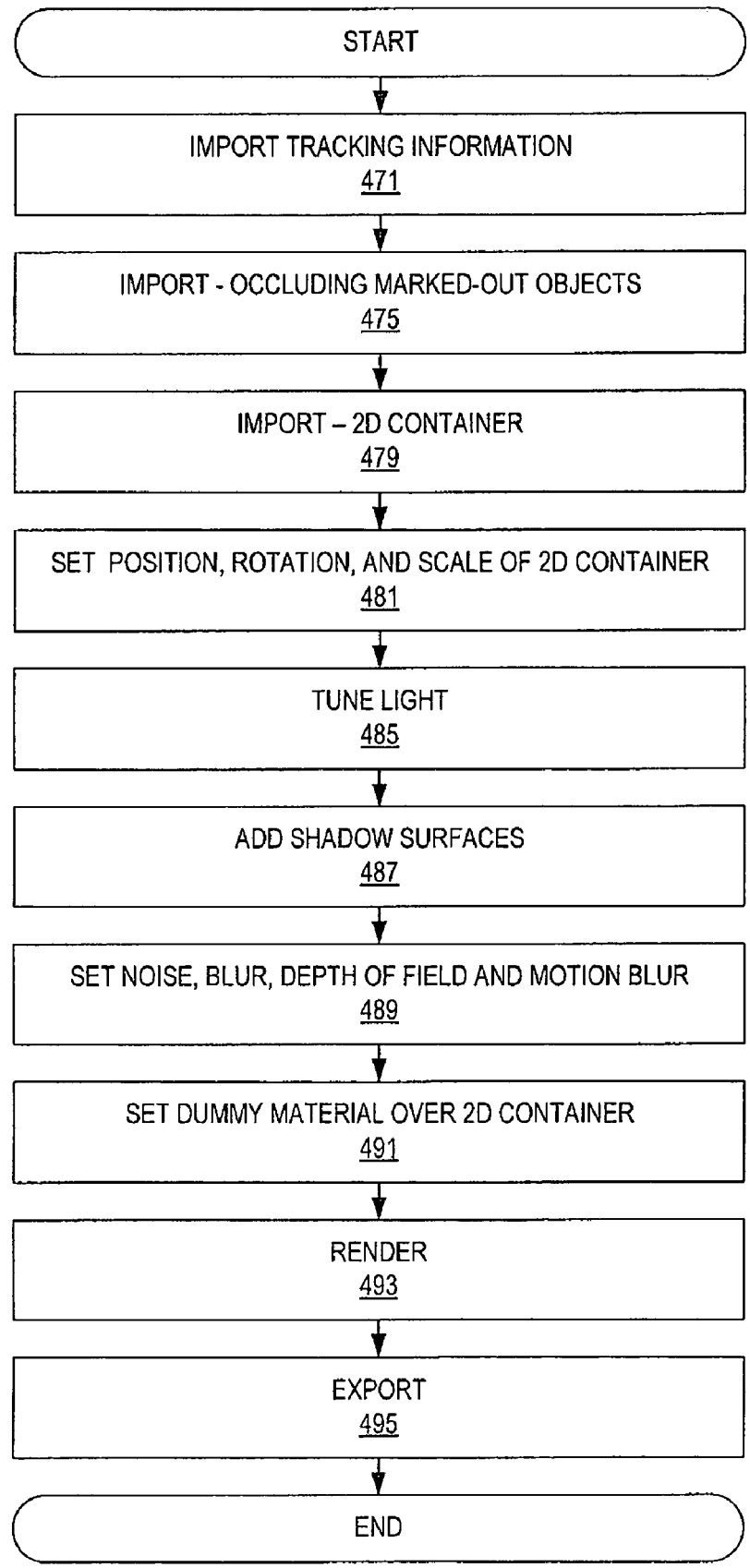
FIG. 8 is a simplified flowchart describing dummy placement in a two-dimensional container.

Reference is made to FIG. 8 that describes a process for implanting a two-dimensional container. Many of the steps are similar to those related to implanting three-dimensional containers (FIG. 7), and will be described by reference thereto.

Step 471 of importing tracking information is the same as step 441. Step 475 is the same as step 443. In step 479, a predefined two dimensional container is imported. In fact, it is preferably a three dimensional object such as billboard, plasma TV, or computer screen, with a two-dimensional surface selected for content placement of objects such as a printed message, a still image or a video clip. The two dimensional container that is imported to container implanter 162 has been previously defined in step 405 of FIG. 6. Steps 481, 485, 487 and 489 are the same as steps 449, 451, 453, and 455 of FIG. 7, respectively. In step 491 the operator of artwork provider 118 inserts two-dimensional dummy test artwork for placement on the selected surface of the container; for example, a video clip for covering a TV screen. Step 493 is the same as step 461, and step 495 is the same as step 465 of FIG. 7.

Artwork Specification—Two- and Three-Dimensional

Artwork specs are provided by service center 160 to artwork provider 118, as guidelines for selecting and/or adapting artwork for a specified container. Most of the artwork specs are generated and tagged during step 405 of FIG. 6.

Figures 9, 10:
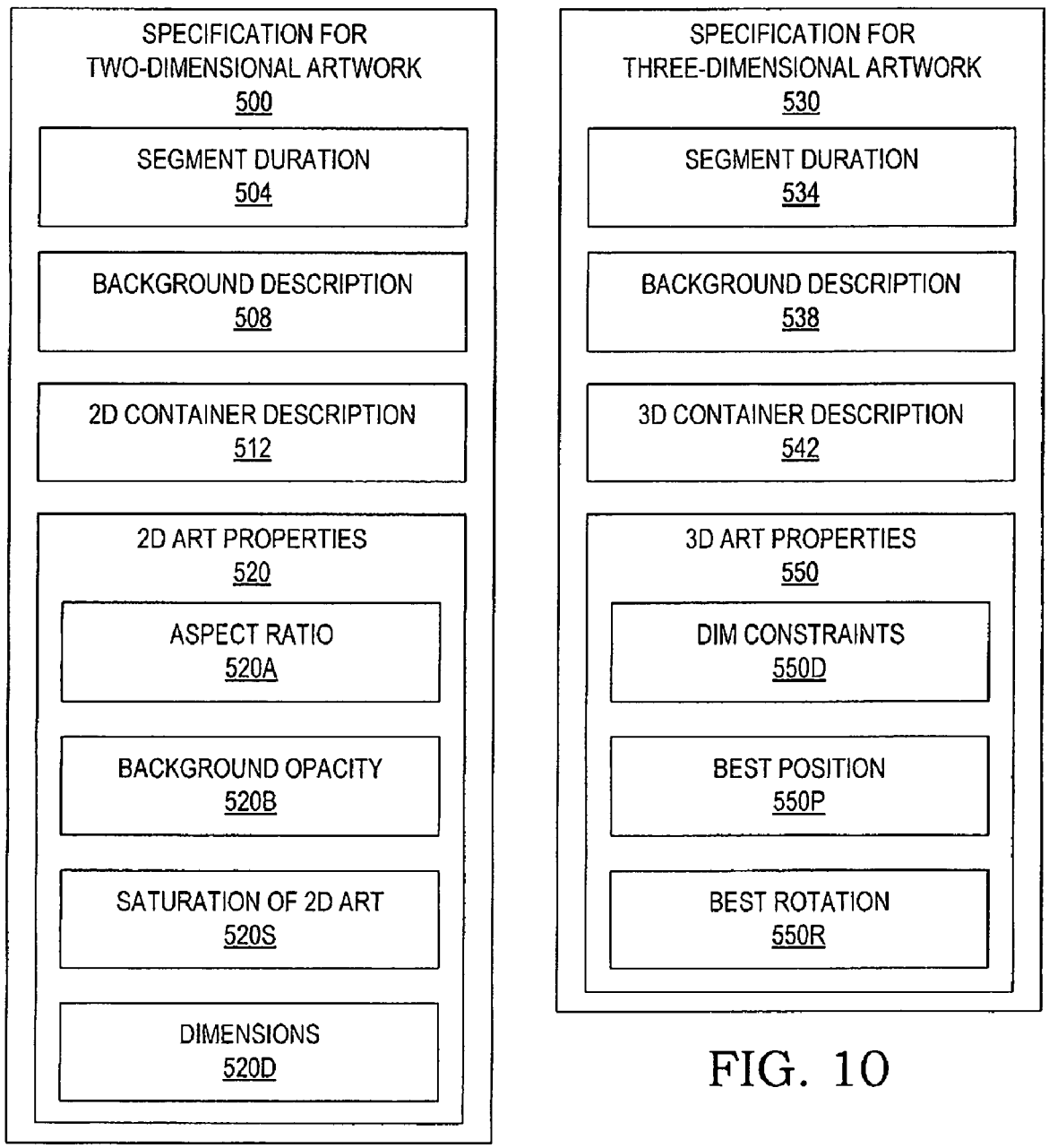
FIG. 9 is a simplified block diagram describing specification of 2D artwork.
FIG. 10 is a simplified block diagram describing specification of 3D artwork.

Reference is made to FIG. 9, where specification for two-dimensional artwork 500 specifies various properties of artwork that is suited for a specified two-dimensional container. Segment duration 504 describes the time that the artwork will be shown on screen. This comes to assist the operator of 118 who may have preferences and priorities regarding what embedded artwork will benefit from a longer time on screen. Background description 508 includes contextual information for the container, for example, "children oriented" or "beach scene". 2D container description 512 describes the object that supports the two-dimensional container (and will support the artwork to be selected), by using a picture extracted from the video, an illustration, or a narrative title such as "Billboard" or "TV Screen". 2D art properties 520 define requirements for the two dimensional artwork. Aspect ratio 520A describes the pixel aspect ratio of the artwork. Every pixel can have square or rectangular shape. Background opacity 520B defines whether the artwork should include alpha channel along with the standard RGB channels. Dimensions 520D describes the preferred width and height in pixels to start with, such as 320×240 pixels or 720×576 pixels.

Reference is made to FIG. 10, where specification for three-dimensional artwork 530 specifies various properties of artwork that is suited for a specified three-dimensional container. Segment duration 534 and background description 538 are the same as segment duration 504 and background description 508, respectively, described above 3D container description 542 describes the geometrical characteristics of the containers, which constraints the three-dimensional artwork that can fit within the container, such as dimensions and orientation. 3D art properties 550 include information about the boundary area of the artwork. For example, the container's shape is described as a cube shape placed on a table. If an inserted 3D artwork piece is non-cubical and/or smaller than the container, but can be contained within the container boundaries, than the operator of artwork provider 118 can determine where to put the artwork piece (for example, a soda can) within the cubic container. In addition, the operator may determine an angular rotation for the inserted artwork. To facilitate artwork placement, the container includes suggested best placement and rotation for the artwork within the container, and this is used as the default position and rotation of the artwork unless the operator of artwork provider 118 decides otherwise.

Two-Dimensional and Three-Dimensional Artwork

Figure 11:
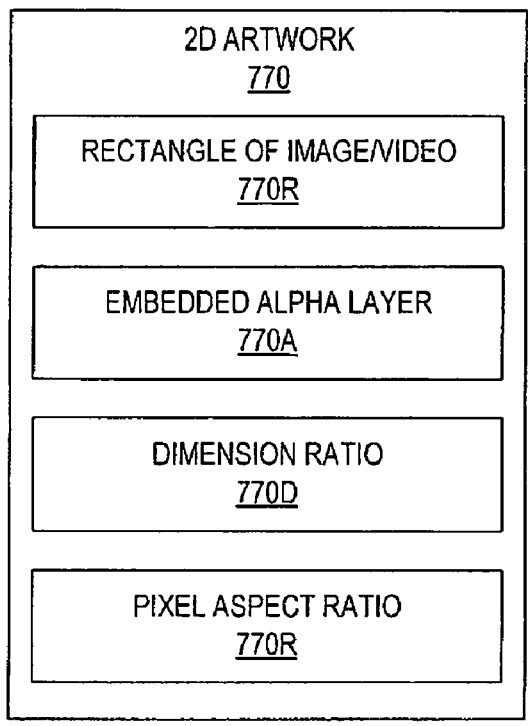
FIG. 11 is a simplified block diagram of 2D artwork.

Reference is made to FIG. 11, which describes the form of 2D artwork that is provided by artwork provider 118. There are two types of 2D artwork: still image and video, preferably but not necessarily provided in rectangular form, under formats common in the art for still images and videos, as represented in FIG. 11 by rectangle of image/video 770R. Both still images and video may optionally have embedded alpha layer 770A, which implies that in addition to the RGB channels of the image there is an opacity channel in the form of alpha channel. Inserting 2D artworks with alpha channel will take into account the alpha value of each pixel. For example, if the alpha value is zero the artwork will be transparent in that pixel, and if the alpha value is one the artwork will cover the original video. The dimension ratio 770D determines the ratio between the width and the height of the artwork in terms of pixels. For example the video can be 320×240 pixels, and in this case the ratio would be 4×3. The Pixel aspect ratio 770R defines if the pixel itself is square or rectangular pixel. Together with the dimension ratio 770D it defines the effective aspect ratio of the image/video.

Figure 12:
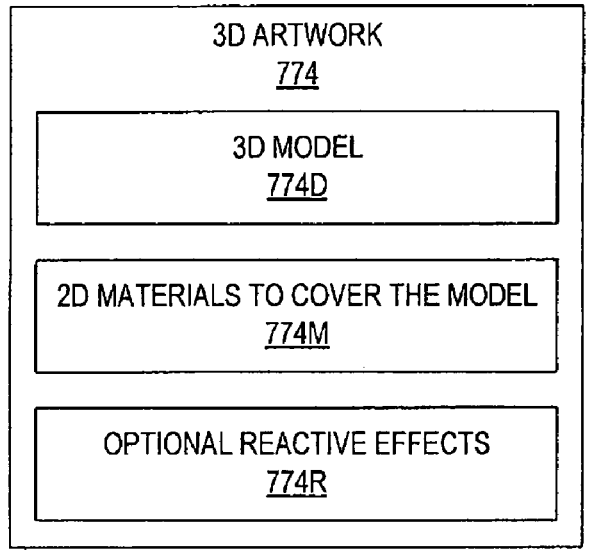
FIG. 12 is a simplified block diagram of 3D artwork.

Reference is made to FIG. 12 that describes the three dimensional artwork. 3D model 774D defines the polygonal shape of the artwork at all its faces. For example, a cereal box shape is composed of six polygons. More curved shapes may have thousands of polygons which together create the curved surface. 2D materials to cover the model 774M include images for covering the surface of the bare 3D model 774D. For example, a small soda can represents the 3D model 774D, while a logo drawn on the surface of the can represents the 2D materials to cover the model 774M. Optional reactive effects 774R describe how the faces of the 3D Model 774D react with elements in the container. For example, it may include a shining) version to artwork provider 118 for another ireration or approval.

Selectable Options for Artwork Presentation

Figure 13:
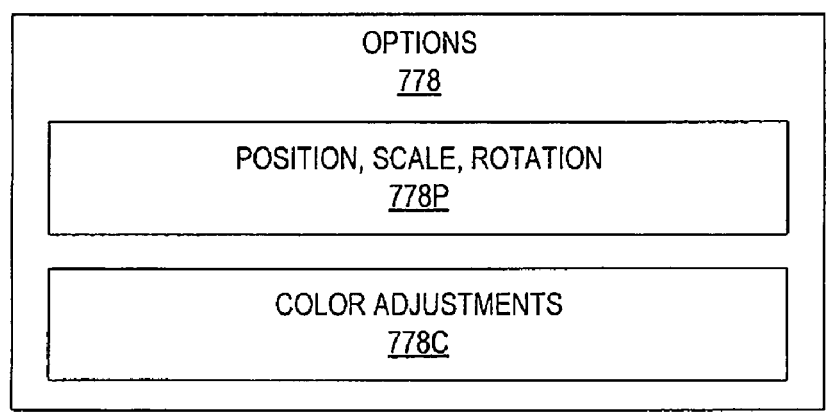
FIG. 13 is a simplified block diagram of artwork placement options.

Reference is made to FIG. 13. Options 778 are optional parameters provided by the artwork provider per each artwork piece; these parameters affect how the respective artwork piece is to be positioned and presented within its container. For example, the alt operate of artwork provider 118 may have aesthetic preferences of how an artwork piece, such as a soda can, will be positioned within a container that is larger then the desired realistically-looking can size. Position, rotation and scale 778P define where the piece of artwork will be positioned within the container (for example, on the center of the container's bottom side), how it is to be rotated, and how it will be scaled to create a realistic impression in comparison to the objects that show in the original video. Color adjustment 778C allows the operator of artwork provider 118 to fine-tune the color of the artwork for matching the colors of the original video.

Artwork Placement

Figure 14:
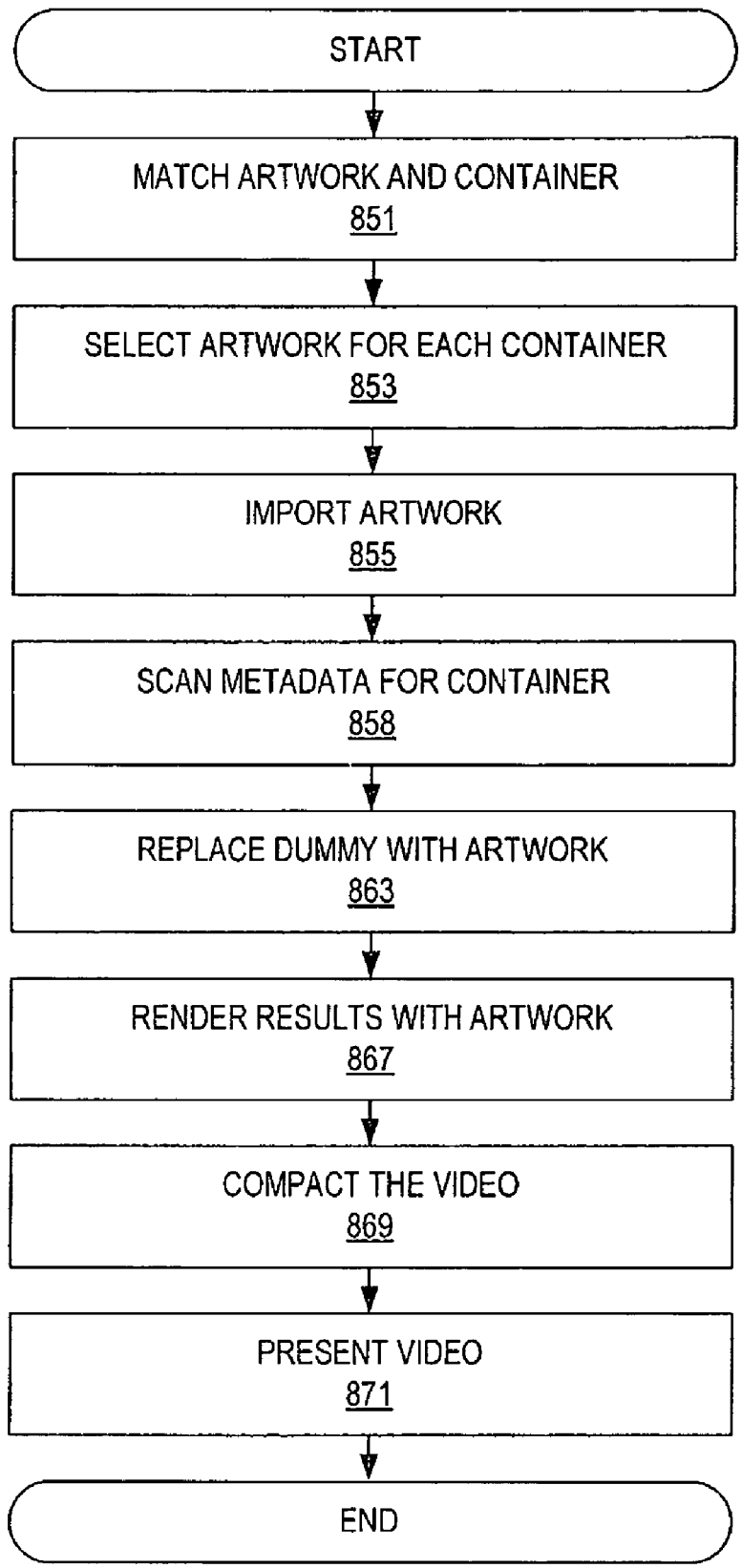
FIG. 14 is a simplified flowchart describing artwork placement.

Reference is made to FIG. 14 that describes the process of placing, by artwork provider 118, of artwork into the containers implanted within a video. In step 851 the characteristics of available artwork and videos' containers specs are compared, to identify suitable matches by both graphical characteristics and context. Then, in step 853, the operator of artwork provider 118 selects artwork for each container. This step may include, if no artwork matches a specific container, or artwork that matches a container is unsatisfactory to the operator, adaptation of artwork (e.g. cropping an image), creation of new custom artwork for the container, or entering null artwork which effectively cancels a respective container.

In step 855 the artwork is imported to renderer 164. In step 858 the renderer scans the metadata for containers. In step 863 the renderer integrates visually replaces the dummy objects with the artwork itself. The replacement in this step is logically and not yet graphically. This means that in the metadata, the artwork file replaces the dummy file and linked to the respective container within the video in step 867 renderer 164 renders the video with the artwork inside the container thus creating a new video version, showing the artwork, selected in step 853, placed inside the original video. In optional step 869 the new video version is compacted, for example by eliminating non-participating video parts or using a still image for representing a video segment, reducing resolution, and/or excessively compressing. Finally, in step 871 the system presents the (compacted) version to artwork provider 118 for another iteration or approval.

The Rendering Process

Reference is made to FIG. 15, which describes the operation of renderer 164 in a preferred embodiment of the present invention. The operation is described from the moment it starts rendering to the moment it produces a modified version of the video with the artwork inside. In step 901 all the resources are gathered and loaded to the computer storage and RAM. The resources include the original video, the containers and the artwork. In step 905, renderer 164 organizes all the resources to gain optimized result in sense of time. It does that by reformatting the resources to be in data structures that would enable the fastest access to each segment in the resource. It preferably applies known methods from the field of software engineering such as tree structure for some of the resources, serializing XML files to hash tables and fast access arrays, and using advanced memory allocation for continues memory areas. In step 911, renderer 164 loads all the rendering operators that contribute to the creation of the version onto the processing unit of its graphic engine. For example, the tracking information which creates an animation to the implanted artwork, the blur, noise, anti aliasing filters, light and basically all the effects that were defined in the graphic authoring are being loaded to the graphic engine. In step 915 a rendering loop is being triggered. This means that in every loop's iteration a new frame is created out of the resources and the effects. In step 919, the graphic engine performs native 3D rendering which creates a 2D rendered layer out of the 3D model. This means that out of the 3D model which holds the placed artwork (in case of two dimensional artwork) or 3D model that represents the artwork (in case of three dimensional artwork), this step performs the transformation of a three dimensional object to two dimensional image. In addition, in this step there are some effects that affect the three dimensional rendering. For example, motion blur is an effect that takes into accounts the three dimensional movement and position of the object to create a specific motion blur effect. Another example is the shadow casting which takes into account the three dimensional position of the object and light to create a three dimensional shadow which in itself is being transform to a two dimensional image. In step 923, the graphic engine composes the original video, the occlusion layer and the rendered 2D layer to create a sequence of 2D frames. In addition, several 2D effects are executed on the different layers (occlusion, render layer, background layer) before they are composed together. For example, the 2D rendered layer is passed through an anti aliasing filet which smoothes the rendered result; another example is the blur effect that also filters the layer of the rendered result. In step 927, the resulted frames from the graphic engine are shifted to the encoding task's buffer. In step 931, the separate frames are encoded into a video file which is ready to be sent back to the artwork provider or to the final version 224.

Video Transformation During Content Placement

Figure 17:
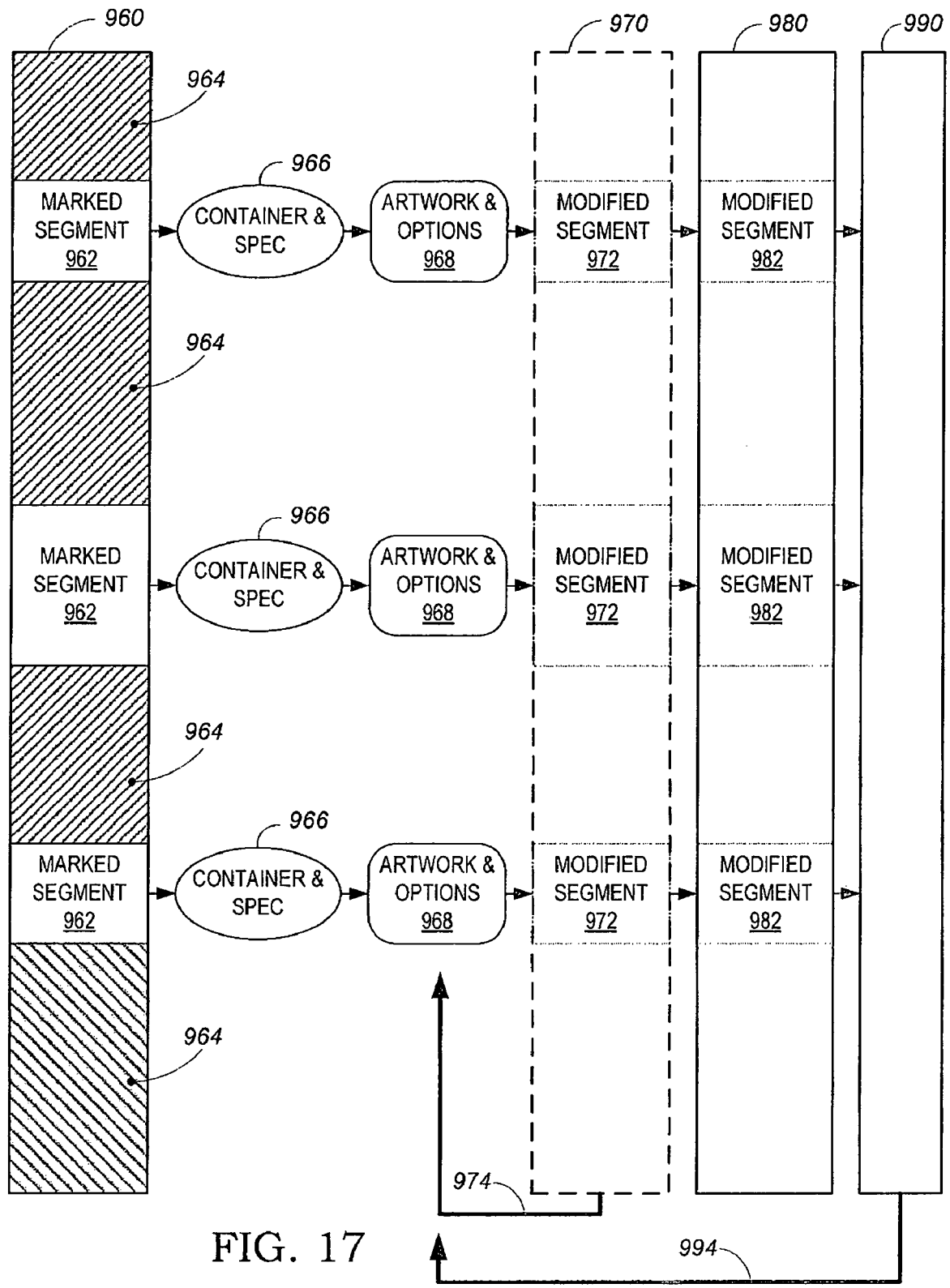
FIG. 17 is a simplified flow diagram illustrating virtual content placement according to preferred embodiments of the present invention.

Reference is now made to FIG. 17 that summarizes the process of virtual content placement according to preferred embodiments of the present invention described above, focusing on the transformations that an original video 960 passes. Thus, original video 960 is obtained, and then marked, preferably under input from a human operator, for identifying one or more marked segments 962 that are suitable for content placement, leaving the rest of the video segments 964 unmarked. Still preferably under commands received from a human operator, one or more containers 966 are adapted to and implanted in each marked segment 962, each container being 2D or 3D, and preferably being accompanied by a legible spec that defines the parameters of artwork that is suitable for that container. An artwork piece 968 is then received for each respective container. Artwork 968 preferably complies with the spec of the respective container and is preferably accompanied by options that are parameters that affect visual aspects of how the artwork will show. Then, preferably under an automatic process without the need for detailed manual commands from a human operator, each marked segment 962 is combined with its respective artwork piece(s) 968 under the instructions of the respective container (s) 966, to provide a respective modified segment 972 that shows the artwork piece(s) positioned within and animated according to the respective marked segment 962. The collection of one or more modified segments 972 that are respective to the one or more marked segments 962, form the basis for a modified video 970. However, modified video 970 can be compacted by excluding part or all of unmarked segments 964, using excessive compression and/or reduced resolution or color space, or even by representing a modified segment 972 by a single frame therefrom demonstrating the respective artwork 968 embedded within the respective marked segment 962. Initially, artwork 962 may be a dummy, in which case modified video 970 becomes a demo that just shows visually the space and shape available for artwork placement within each marked segment 962.

A human operator of artwork provider 118 then preferably decides whether the (non-demo) modified version is satisfactory, and if not, passage 974 is used for another iteration of artwork placement, where all or some artwork pieces and/or options are changed, to yield another modified version 970. Additional iterations through passage 974 take place until artwork provider 118 is satisfied with modified version 970, and then a final version 980 is generated by embedding a full-quality version 982 of each of the latest modified segment 972 within original video 960. In some embodiments, the final version is further adapted for a specific distributor by creating an end product 990 that differs from final version 980 by characteristics such as resolution, color space, aspect ratio, format, and/or feature length.

Passage 994 can be then used for utilizing the same original video 960, marked segments 962 and containers 966 for generating additional editions of final version 980 and end product 990 with different artwork 968 embedded therein.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A method of operating at least one computer to embed artwork in videos, the method comprising:
   a. preparing an original video for placement by:
      i. obtaining said original video,
      ii. marking a segment of said original video, thereby defining a marked segment, and
      iii. implanting a container within said original video in association with said marked segment, said container comprising computer-executable video processing commands for creating video graphic effects, said commands based on video content of said marked segment; and b. repeating at least once a session of artwork placement by:
   i. selecting an artwork piece for said container, and
   ii. executing said computer-executable video processing commands of said container on said artwork piece, wherein said execution produces said video graphic effects on said artwork piece, thereby automatically rendering a modified video segment in which said artwork piece is embedded within and animated in accordance with said marked segment.

2. The method of claim 1, wherein said marking a segment is further made at least one more time for marking at least one more segment.

3. The method of claim 1, wherein said implanting a container is further made at least one more time for implanting at least one more container.

4. The method of claim 3, wherein said selecting and said executing are made at least one more time within each said session.

5. The method of claim 1, wherein said at least once is at least twice.

6. The method of claim 1, wherein said computer-executable video processing commands in said container are to produce at least one video graphic effect selected from the group consisting of: curviness, texture, video filter, and occlusion.

7. A software product embedded in a computer readable media, for instructing at least one computer to:
   a. prepare an original video for placement by:
      i. obtaining said original video,
      ii. receiving user instructions for marking a segment of said original video, thereby defining a marked segment, and
      iii. receiving user instructions for implanting a container within said original video in association with said marked segment, said container comprising computer-executable video processing commands for creating video graphic effects, said commands based on video content of said marked segment; and
   b. repeat at least once a session of artwork placement by:
      i. receiving an artwork piece for said container; and
      ii. executing said computer-executable video processing commands of said container on said artwork piece, wherein said execution produces said video graphic effects on said artwork piece, thereby automatically rendering a modified video segment in which said artwork piece is embedded within and animated in accordance with said marked segment.

8. The software product of claim 7, wherein said at least once is at least twice.

9. The software product of claim 7, wherein said computer-executable video processing commands in said container are to produce at least one video graphic effect selected from the group consisting of: curviness, texture, video filter, and occlusion.

10. A method of operating at least one computer to embed artwork in a marked video segment that forms part of an original video, according to a container that is respective to the marked video segment, the method comprising:
    a. obtaining the video segment;
    b. obtaining the container, said container comprising computer-executable video processing commands for creating video graphic effects, said commands based on video content of said marked segment; and
    c. repeating at least once:
       i. receiving an artwork piece adapted for the container, and
       ii. executing said computer-executable video processing commands of said container on said artwork piece, wherein said execution produces said video graphic effects on said artwork piece, thereby automatically rendering a modified video segment in which said artwork piece is embedded within and animated in accordance with said marked segment; and
    d. producing a modified version of the original video, said producing includes replacing each said marked video segment with said corresponding modified video segment.

11. The method of claim 10, wherein said at least once is at least twice.

12. The method of claim 10, wherein said modified version of said original video is further compacted, in comparison with said original video, by at least one of the group consisting of: excluding at least one part of said original video; representing a video segment by a representative still image; applying a lower resolution than said original video; reducing the color space, and applying excessive video compression.

13. The method of claim 10, wherein said computer-executable video processing commands in said container are to produce at least one video graphic effect selected from the group consisting of: curviness, texture, video filter, and occlusion.

14. A service center for embedding content in videos, said service center including at least one computer, said at least one computer comprising:
    a. a container implanter unit configured to prepare an original video for placement by:
       i. obtaining said original video,
       ii. marking a segment of said original video, thereby defining a marked segment, and
       iii. implanting a container within said original video in association with said marked segment, said container comprising computer-executable video processing commands for creating video graphic effects, said commands based on video content of said marked segment; and
    b. a renderer unit configured to repeat at least once a session of artwork placement by:
       i. selecting an artwork piece for said container, and
       ii. executing said computer-executable video processing commands of said container on said artwork piece, wherein said execution produces said video graphic effects on said artwork piece, thereby automatically rendering a modified video segment in which said artwork piece is embedded within and animated in accordance with said marked segment.

15. The service center of claim 14, wherein said at least once is at least twice.

16. The service center of claim 14, wherein said computer-executable video processing commands in said container are to produce at least one video graphic effect selected from the group consisting of: curviness, texture, video filter, and occlusion.

17. A method of operating at least one computer to place content in videos, the method comprising:
    a. obtaining an original video;
    b. marking at least one segment of said original video, thereby defining at least one marked segment;
    c. implanting at least one container within said original video in association with at least one said marked segment, said container comprising computer-executable video processing commands for creating video graphic effects, said commands based on video content of said marked segment; and d. for each unique edition of at least two different editions, repeating at least once:
  i. receiving from an artwork provider, for each said container; a respective artwork piece,
  ii. executing said computer-executable video processing commands of each said container on each said respective artwork piece, wherein said execution produces said video graphic effects on said artwork piece, thereby automatically producing a modified video that shows each said artwork piece embedded within and animated in accordance with said marked segment that is respective to said container that is respective to said artwork piece, and
  iii. sending said modified video to said artwork provider.

18. The method of claim 17, wherein said modified video is further compacted, in comparison with said original video, by at least one of the group consisting of: excluding at least one part of said original video; representing a video segment by a representative still image; applying a lower resolution than said original video; reducing the color space; and applying excessive video compression.

19. The method of claim 17, further comprising, for at least one said edition: creating a final version by placing each said respective artwork piece within each said container, within said original video.

20. The method of claim 19, further comprising: adapting said final version for a selected distributor thereby providing an end product, and sending said end product to said selected distributor.

21. The method of claim 17, wherein said computer-executable video processing commands in said container are to produce at least one video graphic effect selected from the group consisting of: curviness, texture, video filter, and occlusion.

* * * * *